(12) United States Patent
Brune et al.

(10) Patent No.: US 7,990,150 B2
(45) Date of Patent: *Aug. 2, 2011

(54) MULTIFREQUENCY LOCATING ARRANGEMENT WITH FREQUENCY DESIGNATION

(75) Inventors: Guenter W. Brune, Bellevue, WA (US); John E. Mercer, Kent, WA (US)

(73) Assignee: Merlin Technology, Inc., Renton, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/761,851

(22) Filed: Apr. 16, 2010

(65) Prior Publication Data

US 2010/0201366 A1   Aug. 12, 2010

Related U.S. Application Data

(60) Division of application No. 12/463,189, filed on May 8, 2009, now Pat. No. 7,728,595, which is a division of application No. 11/954,199, filed on Dec. 11, 2007, now Pat. No. 7,548,065, which is a continuation of application No. 11/281,969, filed on Nov. 16, 2005, now Pat. No. 7,327,144, which is a continuation of application No. 10/822,123, filed on Apr. 10, 2004, now Pat. No. 7,015,697, which is a division of application No. 10/007,351, filed on Nov. 7, 2001, now Pat. No. 6,756,783, which is a continuation-in-part of application No. 09/854,036, filed on May 14, 2001, now abandoned, which is a continuation of application No. 09/323,722, filed on Jun. 1, 1999, now Pat. No. 6,285,190.

(51) Int. Cl.
*G01V 3/08* (2006.01)

(52) U.S. Cl. .......................................... 324/326; 175/45

(58) Field of Classification Search ........................ None
See application file for complete search history.

(56) References Cited

U.S. PATENT DOCUMENTS

| | | |
|---|---|---|
| 3,226,633 A | 12/1965 | Schneider |
| 4,451,789 A | 5/1984 | Meader |
| 4,710,708 A | 12/1987 | Rorden et al. |
| 4,845,433 A | 7/1989 | Kleinberg et al. |
| 4,933,640 A | 6/1990 | Kuckes |
| 5,019,822 A | 5/1991 | Kirkland |
| 5,119,028 A | 6/1992 | Mooney et al. |

(Continued)

OTHER PUBLICATIONS

J. R. Wait and L. L. Campbell, The Fields of an Oscillating Magnetic Dipole Immersed in a Semi-Infinite Conducting Medium, Jun. 1953, Journal of Geophysical Research, V 58, No. 2, pp. 167-178.

(Continued)

*Primary Examiner* — Jay M Patidar
(74) *Attorney, Agent, or Firm* — Pritzkau Patent Group, LLC

(57) ABSTRACT

In a system in which a transmitter is moved through the ground in a region, the system including a locating arrangement for tracking the position of and/or guiding the transmitter as the transmitter moves through the ground, a locating arrangement includes a configuration, forming part of the transmitter, for transmitting a locating signal at a current one of at least two locating frequencies and for transmitting a frequency designation identifying one of the frequencies of the locating signal. A locator receives the frequency designation and the locating signal for use in tracking the transmitter and a frequency tracking arrangement switches the locator between different ones of the locating frequencies, as the current locating frequency, based on said frequency designation. In one feature, the locating arrangement is configured for automatically switching between the frequencies based on the frequency designation.

2 Claims, 16 Drawing Sheets

U.S. PATENT DOCUMENTS

| | | |
|---|---|---|
| 5,157,605 A | 10/1992 | Chandler et al. |
| 5,264,795 A | 11/1993 | Rider |
| 5,337,002 A | 8/1994 | Mercer |
| 5,361,029 A | 11/1994 | Rider et al. |
| 5,585,726 A | 12/1996 | Chau |
| 5,654,638 A | 8/1997 | Shoemaker |
| 5,907,242 A | 5/1999 | Gard |
| 5,917,325 A | 6/1999 | Smith |
| 6,014,026 A | 1/2000 | Mercer |
| 6,285,190 B1 | 9/2001 | Brune et al. |
| 6,417,666 B1 | 7/2002 | Mercer |

OTHER PUBLICATIONS

H. K. Sacks, Eelecromagnetic Technique for locating Boreholes, Report of Investigations 8302, 1978, US Dept of the Interior, pp. 1-14.

Radiodetection Limited, Monitoring the Progress of Horizontal Boring Tools, Apr. 1990, Radiodetection Limited. technical specifications sheet.

FLP SETUP

MULTIFREQUENCY LOCATING ARRANGEMENT WITH FREQUENCY DESIGNATION

RELATED APPLICATIONS

The present application is a divisional application of application Ser. No. 12/463,189, filed May 8, 2009 now U.S. Pat. No. 7,728,595; which is a divisional application of application Ser. No. 11/954,199, filed Dec. 11, 2007 and issued as U.S. Pat. No. 7,548,065 on Jun. 16, 2009; which is a continuation application of application Ser. No. 11/281,969, filed on Nov. 16, 2005 and issued as U.S. Pat. No. 7,327,144 on Feb. 5, 2008; which is a continuation application of application Ser. No. 10/822,123, filed on Apr. 10, 2004 and issued as U.S. Pat. No. 7,015,697 on Mar. 21, 2006; which is a divisional application of application Ser. No. 10/007,351, filed Nov. 7, 2001 and issued as U.S. Pat. No. 6,756,783 on Jun. 29, 2004; which is a Continuation-In-Part of application Ser. No. 09/854,036 filed May 14, 2001 that is now abandoned; which is a continuation application of application Ser. No. 09/323,722 filed Jun. 1, 1999 and issued as U.S. Pat. No. 6,285,190 on Sep. 4, 2001; the disclosures of which are incorporated herein by reference.

BACKGROUND OF THE INVENTION

The present invention is related generally to the field of locating and/or guiding an underground boring tool using a locating signal which is transmitted through the ground and, more particularly, to a method and associated apparatus for locating and/or guiding the boring tool in a way which compensates for skin effect that potentially introduces error in locating and/or guiding the boring tool as a result of conductivity of the earth through which the locating signal passes. A multi-frequency locating system is introduced including highly advantageous transmitter and locator configurations. A highly advantageous tone detection arrangement is also introduced.

Referring to FIG. 1, boring tools are typically guided or located by transmitting a dipole field from a dipole transmitter which is positioned within the drill head of the boring tool. The locating/dipole field is an oscillating signal that is generally emitted from a dipole antenna oriented along the rotational axis of the drill head. FIG. 1 illustrates a coordinate system including x, y and z axes with a dipole transmitter D at its origin. For a point p, at a radius r from the origin, the dipole equations are given as:

$$B_x = \frac{3x^2 - r^2}{r^5} \quad (1)$$

$$B_y = \frac{3xy}{r^5} \quad (2)$$

$$B_z = \frac{3xz}{r^5}, \text{ and} \quad (3)$$

$$r^2 = x^2 + y^2 + z^2 \quad (4)$$

Where $B_x$, $B_y$ and $B_z$ represent orthogonal components of the dipole field at point p. The dipole equations are recited herein for the benefit of the reader since these equations form a fundamental basis for the use of a dipole field in locating applications. One such locating system is described, for example, in U.S. Pat. No. 5,337,002 which is commonly assigned with the present application. Traditionally, boring tool systems have not used compensation for conductivity of the soil even though this conductivity introduces a phenomenon commonly referred to as skin effect. While skin effect can result in significant locating errors, applicants submit that prior art systems have not provided such compensation, at least in part, since it is perceived in the art that compensation for skin effect is an extremely complex proposition.

What prior art system designers have generally done is to altogether ignore skin effect. This is tantamount to an assumption of a non-conducting earth. Accordingly, the electromagnetic field emitted by the magnetic dipole of a transmitter into a non-conducting medium (such as air) is described mathematically by the well known cubic law of a magnetic dipole (see FIG. 1). Unfortunately, however, as a direct result of skin depth, drilling in the earth can produce significant deviations from the cubic law when a typical oscillating magnetic dipole field is used. The latter term describes a magnetic dipole having a signal strength that varies sinusoidally with time.

The present invention provides a highly advantageous and heretofore unseen method and associated apparatus which provide compensation for skin effect in underground boring tool applications.

SUMMARY OF THE INVENTION

As will be described in more detail hereinafter, there are disclosed herein arrangements, apparatus and associated methods for skin depth compensation in underground boring applications. Accordingly, in an overall method of operating a system in which a boring tool is moved through the ground in a region which includes an electrical conductivity characteristic and where the system includes an above ground arrangement for tracking the position of and/or guiding the boring tool as the boring tool moves through the ground and in which the system is configured for transmitting a locating signal between the boring tool and the arrangement in the region, the improvement comprises compensating for skin depth error by measuring the locating signal such that measurements of the locating signal include skin depth error introduced as a result of the electrical conductivity characteristic and, thereafter, using the measurements in a way which determines a skin depth corrected position of the boring tool.

In one aspect of the invention a multi-frequency approach is provided which utilizes measured intensities of the locating field at two or more frequencies to extrapolate a zero frequency value of locating signal intensity. The zero frequency value of intensity is then used in position determination. The multi-frequency approach may be used in conjunction with walk-over type locators or with one or more above ground receivers designed for receiving the locating signal at fixed position(s). In one feature, the multi-frequency approach of the present invention does not require knowledge of earth properties or ground surface geometry. The components of the measured magnetic field intensities of the locating field measured at their selected frequencies contain property and geometry effects and pass them on to extrapolated zero frequency values.

In another aspect of the invention, certain intensity measurements of the locating signal are used to determine a value for skin depth to be used during subsequent drilling, these certain measurements being obtained in a calibration procedure by transmitting the locating signal from the boring tool on the surface of the ground to the above ground arrangement prior to drilling.

In still another aspect of the invention, a determined value of skin depth is used in one locating scenario with a walkover detector in which the walkover detector is used to establish an overhead position directly above the boring tool using a locating signal transmitted at a single frequency. The measured overhead signal strength of the locating signal transmitted from the boring tool is then used in conjunction with the determined value of the skin depth to determine the depth of the boring tool below the overhead position on the surface of the ground such that the depth of the boring tool is established based at least in part on the skin depth.

In another locating scenario, with the locating signal transmitted at a single frequency, the boring tool moves through the ground along an intended path while transmitting the locating signal and moves in an orientation which includes pitch. The boring tool includes pitch sensing means and the locating signal exhibits a field defined forward point at the surface of the ground with the boring tool at a particular point along the intended path. The field defined forward point being vertically above an inground forward point on the intended path through which the boring tool is likely to pass. The boring tool is located by using a walkover detector to receive electromagnetic data which identifies the forward point. Signal strength of the locating signal is then measured at the forward point, as transmitted from the boring tool at the particular point, and the measured signal strength of the locating signal is used at the forward point in conjunction with the determined value of the skin depth and a sensed pitch value to determine the depth of the boring tool referenced to the particular point and to determine a forward distance on the intended path from the particular point at which the boring tool is located to the in-ground forward point.

Alternatively, the field defined forward point may be located on or immediately above the surface of the ground and an overhead point may be identified on or immediately above the surface of the ground directly above the boring tool at the particular point. The forward distance is measured between the overhead point and the forward point as, defined at the surface of the ground. Using the forward distance, the determined value of skin depth and certain characteristics of the locating signal at the forward point, a skin depth corrected depth of the boring tool at the particular point is determined.

In another alternative, the intended path of the boring tool in the region is configured such that the forward point is at a higher elevation on the surface of the ground than the particular point. The actual depth of the boring tool is then established at the particular point and a vertical elevation difference is measured between the particular point and the forward point. Thereafter, the locating signal is sensed at the forward point while the boring tool is at the particular point to determine an uncorrected depth of the boring tool which is subject to skin depth error. Using the measured vertical elevation difference, the actual depth of the boring tool at the particular point and the uncorrected depth of the boring tool measured from the forward point, a forward point skin depth correction factor is determined. During subsequent drilling operations the forward point skin depth correction factor is used in determining skin depth corrected depth with the boring tool at subsequent particular points.

In another aspect of the invention, using a system in which a boring tool is moved underground in a region during selective rotation of the boring tool, the boring tool is configured with a transmitter for transmitting a locating signal for use in tracking an underground position of the boring tool in the region and for changing at least one characteristic of the locating signal responsive to subjecting the boring tool to a predetermined roll sequence during underground operation. The predetermined roll sequence includes the steps of rotating the boring tool for one time period at a first roll rate in timed relation to rotating the boring tool for another time period at a second roll rate, followed by a halt in rotation. In one feature, the characteristic is the frequency of the locating signal. In another feature, the characteristic is the power of the locating signal.

In still another aspect of the invention, a transmitter, configured for installation in a boring tool, includes a first arrangement for transmitting a locating signal at a selected one of at least two frequencies. A frequency selection arrangement, cooperating with the first arrangement, determines the selected one of the frequencies based, at least in part, on a pitch orientation of the transmitter. In one feature, the frequency selection arrangement determines the selected one of the frequencies responsive to the pitch orientation of the transmitter upon power-up of the transmitter. In another feature, the frequency selection arrangement is configured for detecting a pitch orientation sequence to which the transmitter is subjected. Responsive to the detected pitch orientation sequence, the locating signal frequency is changed.

In yet another aspect of the invention, a transmitter configured for installation in a boring tool includes a first arrangement for transmitting a locating signal having a selected one of at least two frequencies for use in tracking the boring tool and a frequency selection arrangement, cooperating with the first arrangement, for detecting the selected one of the frequencies as a power-down frequency at a time when the transmitter is switched from an operational state to an off state and for restarting the first arrangement at the power-down frequency upon switching from the off state to the operational state.

In a further aspect of the invention, a locator for receiving the locating signal is configured for receiving the locating signal at any selected one of the locating frequencies for use in tracking the boring tool. A control arrangement, forming part of the locator, detects the selected one of the frequencies as a power-down locating frequency at a time when the locator is powered down and, thereafter, powers up the locator at least initially configured for receiving the power-down locating frequency.

In another aspect of the invention, the system includes a locator for tracking the position of and/or guiding the boring tool as the boring tool moves through the ground. The boring tool includes a transmitter which transmits a locating signal at a selected one of at least two frequencies for use in tracking the boring tool. The locator, in turn, receives the locating signal. The selected frequency of the locating signal is indicated to the locator by the boring tool using a frequency control arrangement which forms part of the transmitter. In one implementation, a frequency indication is encoded on a carrier, which carrier is also used in determining the depth of the boring tool. In another implementation, the frequency indication is encoded on a carrier which is distinct from another carrier that is used in the boring tool depth determination.

In still another aspect of the invention, in a system in which a boring tool is moved through the ground in a region including a locating arrangement for tracking the position of and/or guiding the boring tool as the boring tool moves through the ground, the locating arrangement includes a transmitter forming part of the boring tool for transmitting a locating signal at a selected one of at least two locating frequencies and for transmitting a frequency designation identifying the selected locating frequency of the locating signal. A locator is included in the system configured for receiving the locating signal for use in tracking the boring tool and itself including a frequency tracking arrangement for switching the locator between different ones of the locating frequencies based on the frequency designation.

In a further aspect of the invention, a tone decoder is disclosed for decoding an incoming analog data stream containing at least one tone. The incoming analog data stream is converted to a binary data stream based on one switching threshold. The binary data stream is then sampled over a sample period to establish a plurality of samples, each of which is characterized as a binary value, at a rate based on the tone. The samples are used in a way which establishes at least an approximate magnitude of the tone for the sample period. In one feature, alternating ones of the samples are used in contributing to a first value and a second value such that the first value and the second value are cooperatively indicative of at least the approximate magnitude of the tone.

In another aspect of the invention, a tone detection arrangement is disclosed for decoding an incoming data stream that is received in sequential bit times and which incoming data stream contains at least one tone that is selectively present for the duration of each bit time. A plurality of digital filters forms part of the detection arrangement, each of which is tuned for detecting the tone over a filter interval that is at least approximately equal in duration to the bit time from a filter start time to a filter stop time. A first one of the digital filters is started at a first start time in relation to a particular bit time. An additional one of the digital filters is started at an additional start time which occurs following a predetermined interval after said start time of the first digital filter such that a number of the predetermined intervals at least approximately equals the bit time in duration. At the filter stop time of the first digital filter, at least an approximate magnitude of the tone is determined for the filter interval of the first digital filter. At the filter stop time of the additional digital filter, at least the approximate magnitude of the tone is determined for the additional filter interval of the additional digital filter. In one feature, the filters are successively started and restarted in a staggered timed relation such that one filter outputs the approximate magnitude of the tone at a repeating interval corresponding to the predetermined interval at which the filters are started and restarted.

In yet another aspect of the invention, a tone detection arrangement decodes an incoming data stream which contains at least one tone that is selectively present. The tone detection arrangement includes a plurality of digital filters each of which is tuned for detecting the tone over a filter interval from a filter start time to a filter stop time. The digital filters are started in a staggered time relation with respect to one another so as to operate over a plurality of intervals that are in said staggered time relation with respect to one another including a plurality of said filter stop times which conclude the filter intervals in the staggered time relationship. An average magnitude of the tone is determined responsive to the filter stop time of each filter.

BRIEF DESCRIPTION OF THE DRAWINGS

The present invention may be understood by reference to the following detailed description taken in conjunction with the drawings briefly described below.

DETAILED DESCRIPTION OF THE INVENTION

Figure 1:
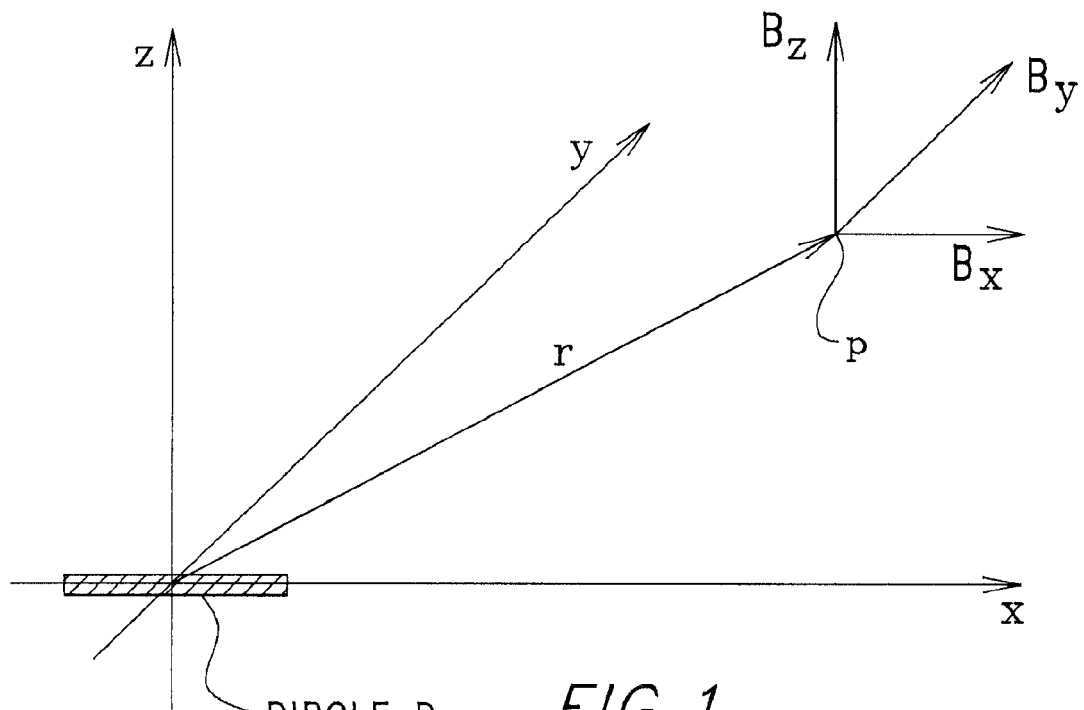
FIG. 1 is a diagrammatic illustration of a coordinate system for purposes of describing the well know magnetic dipole equations.
Figure 2:
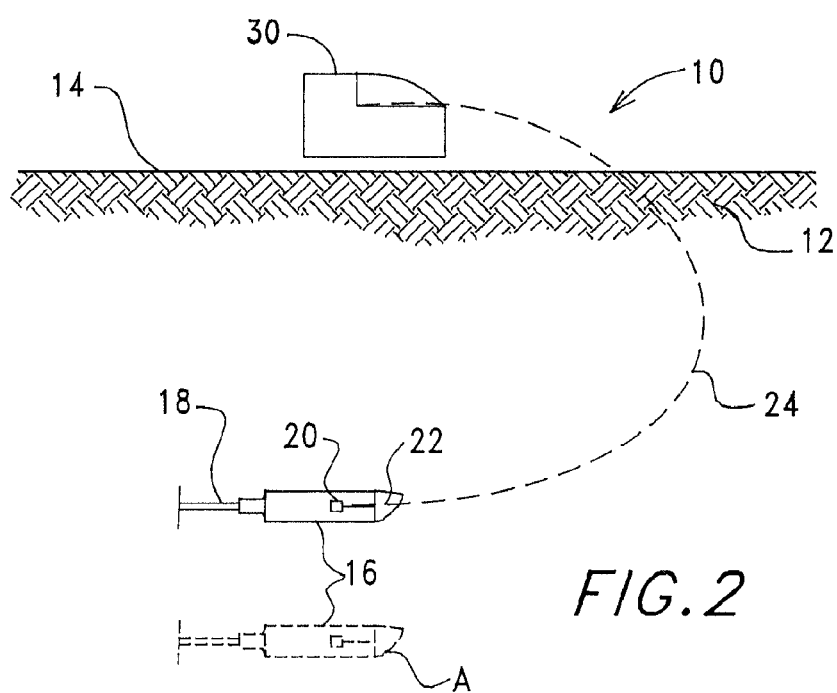
FIG. 2 is a diagrammatic elevational view of a horizontal drilling operation being performed in a region of ground using a portable walkover detector, shown here to illustrate the effects of skin depth on locating the boring tool.

Attention is immediately directed to FIG. 2 which illustrates a boring system 10 operating in a region 12. It is noted that like reference numbers are used to refer to like components wherever possible throughout the various figures. The surface of the ground is indicated by the reference number 14. System 10 includes a boring tool 16 that is positioned on the end of a drill string 18 which is only partially shown. Boring tool 16 includes a dipole transmitter 20 having an antenna 22 that transmits a dipole locating field 24. The latter is received using a walkover portable locator/detector 30. Specific details regarding the implementation of system 10, as well as details regarding the implementation of other types of systems in accordance with the present invention will be given at appropriate points hereinafter. For the moment, discussions will be limited to more general details regarding skin effect as related to the operation of system 10 in order to facilitate the reader's understanding.

Still referring to FIG. 2, locating field 24, emitted by antenna 22 into a non-conducting medium (not shown) such as air is described mathematically by the cubic law, as mentioned above. However, drilling takes place in the earth such as, for example, in region 12 which is assumed to possess electrical conductivity characteristics. These characteristics result in significant deviations from the cubic law when locating field 24 varies sinusoidally in time at a frequency f. With conductivity of region 12 denoted as $\sigma$, the penetration distance of locating field 24 as well as the shape of the magnetic field lines which make up the field depend on the frequency and conductivity parameters. Penetration distance is often called skin depth and is defined as:

$$\delta = \frac{1}{\sqrt{\pi f \mu \sigma}} \quad (5)$$

where $\mu$ denotes the permeability of the earth and $\delta$ is the skin depth. Thus, skin depth decreases if conductivity, $\sigma$, permeability, $\mu$, or frequency, f, increase. Conversely, skin depth becomes infinite at zero frequency or conductivity, in which case the magnetic field is again described by the magnetic dipole relationship. The significance of the zero frequency characteristics will become apparent at an appropriate point below. Increasing conductivity and/or frequency serve to weaken the magnetic flux intensity recorded by locator 30 above ground. If skin effect is not accounted for, the boring tool can appear to be at a position farther from the detector than in actuality. In the present example, where measurements are being taken with a walk-over locator directly over the drill head (OH), the transmitter can appear deeper, at position A, where the boring tool is shown in phantom.

Figure 3:
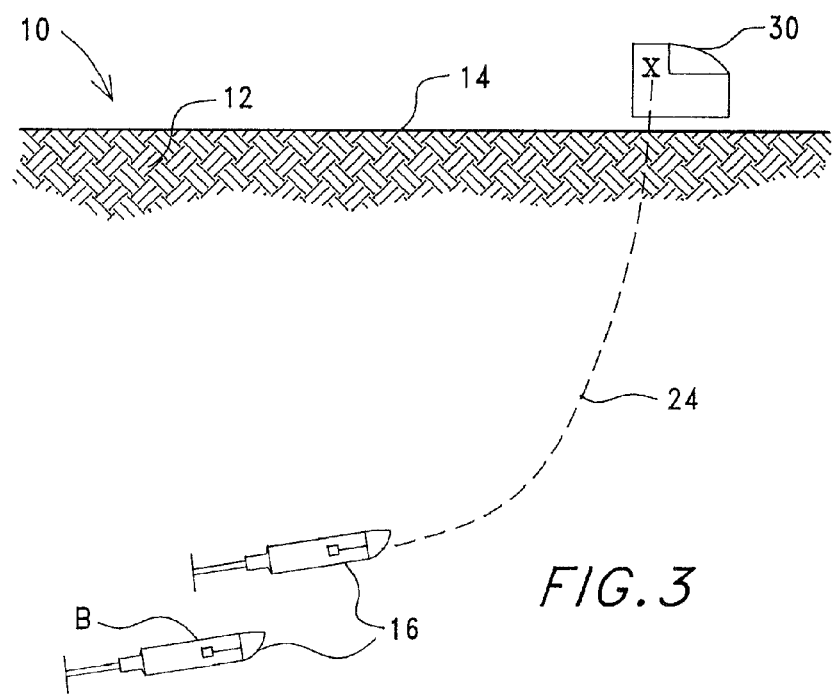
FIG. 3 is a diagrammatic elevational view of another horizontal drilling operation being performed in a region of ground using a portable walkover detector, shown here to illustrate the effects of skin depth on locating the boring tool with the walkover detector at a forward locate point.

Referring now to FIG. 3, system 10 is shown once again with locator 30 at a different position. Specifically, the locator is shown at what is referred to as a forward negative locate point (FNLP) or, more simply, forward locate point (FLP) (see, for example, above referenced U.S. Pat. No. 5,337,002). An "X" is indicative of the configuration of the receiving antenna within locator 30. At the FLP, the flux lines of the locating field are characteristically vertically oriented. In the absence of skin depth compensation, when the locator is at the forward locate point, dipole transmitter 22 can appear deeper and shifted farther away from the locator at position B where the boring tool is shown in phantom.

Figure 4:
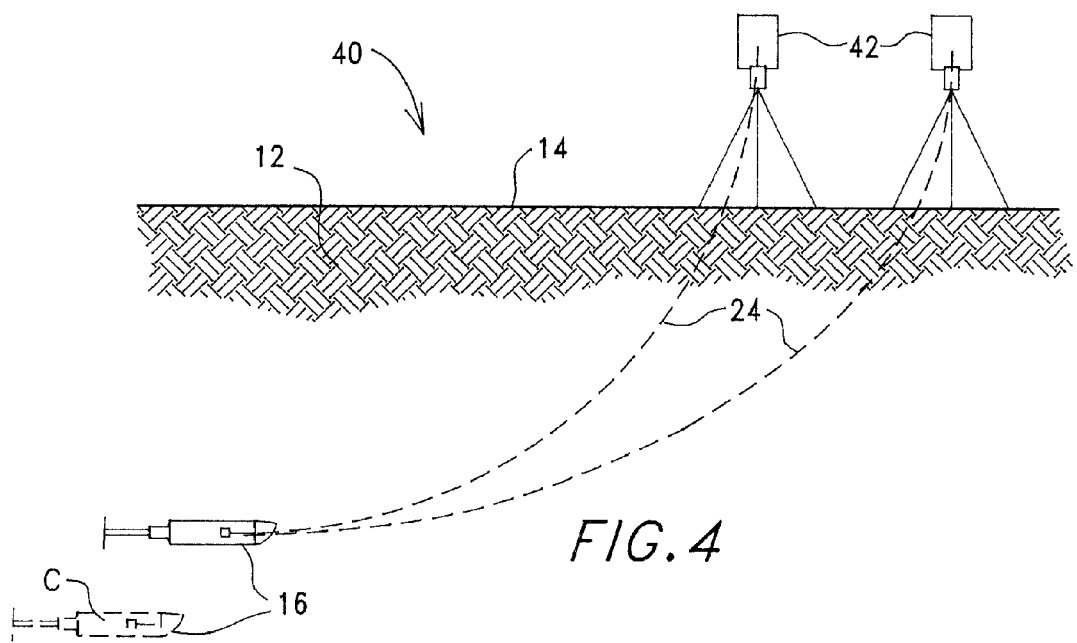
FIG. 4 is diagrammatic elevational view of still another horizontal drilling operation being performed in a region of ground using a locating/tracking system including fixed position above ground locating field detectors, shown here to illustrate the effects of skin depth on locating the boring tool in a system using such fixed position above ground locating field detectors.

U.S. Pat. No. 6,035,951, filing date Apr. 16, 1997, entitled Systems, Arrangements and Associated Methods for Tracking and/or Guiding an Underground Boring Tool is commonly assigned with the present application and is incorporated herein by reference. One example of a highly advantageous locating/guidance system conforming with the subject application is shown in FIG. 4 and is generally indicated by the reference number 40. System 40 uses one or more above ground detectors 42 positionable at fixed locations within region 12 for reception of locating signal 24. With regard to the present application, skin depth produces an effect in system 40 which is similar to that described with reference to FIG. 3. That is, boring tool 16 appears (shown in phantom) to be at position C at a deeper depth and shifted away from detectors 42.

In some prior art systems, an above ground calibration procedure (not shown) is performed in an attempt to measure the signal strength of the dipole transmitter to be used in the boring tool with no consideration of the influence of skin effect. For example, the dipole transmitter and the locator are placed on the surface of the ground at a known separation and orientation. In this regard, it is recognized herein that skin depth has an effect on signal strength when such a calibration procedure is performed. Moreover, the skin effect in this above ground procedure varies from the skin effect encountered when the boring tool is beneath the surface, which further complicates provisions for skin depth compensation. The accuracy of skin depth obtained from an above ground calibration depends to a great extent on the homogeneity of the soil. Skin depth will be accurate if the conductivity of the soil near ground surface, where the calibration has been performed, is similar to that of the soil above the transmitter. Specifically, in the calibration procedure for ranges up to about three times skin depth, skin effect causes an increase in recorded strength of the transverse component of flux intensity and hence the distance between transmitter and receiver appears smaller while an opposite trend can be observed for the radial component of the flux intensity.

Having generally described the influence of skin depth, attention is now directed to details concerning provisions for effective compensation. The discussion immediately above, concerning an above ground calibration procedure, evidences that each component of the magnetic flux intensity is affected differently by earth conductivity and dipole frequency. An exact solution, available for the components of magnetic flux intensity of a magnetic dipole immersed in homogenous earth (i.e., having a uniform conductivity) of infinite extent is given in U.S. Pat. No. 4,710,708, issued to Rorden et al. Rorden, however, relies on the solution only to show that skin effect can be ignored when the range of interest is significantly less than the skin depth. Accordingly, Rorden uses a locating frequency that is low enough (generally 1-100 Hz) to produce a sufficiently high skin depth in equation 5 above to accomplish this objective. The present invention, however, considers the use of such low frequencies as unacceptable because common signal detection hardware and sensors such as coil loops are more sensitive at higher frequencies. Additionally, state of the art systems such as, for example, systems 10 and 40 described above contemplate the use of the locating signal as a carrier for the purpose of transmitting data to above ground locations wherein the data are encoded upon the locating signal. Carrier frequencies in the range of 1-100 Hz limit data transmission capabilities optimistically to rates in the range of only 0.5 to 50 Hz according to the Nyquist criteria.

Figure 5:
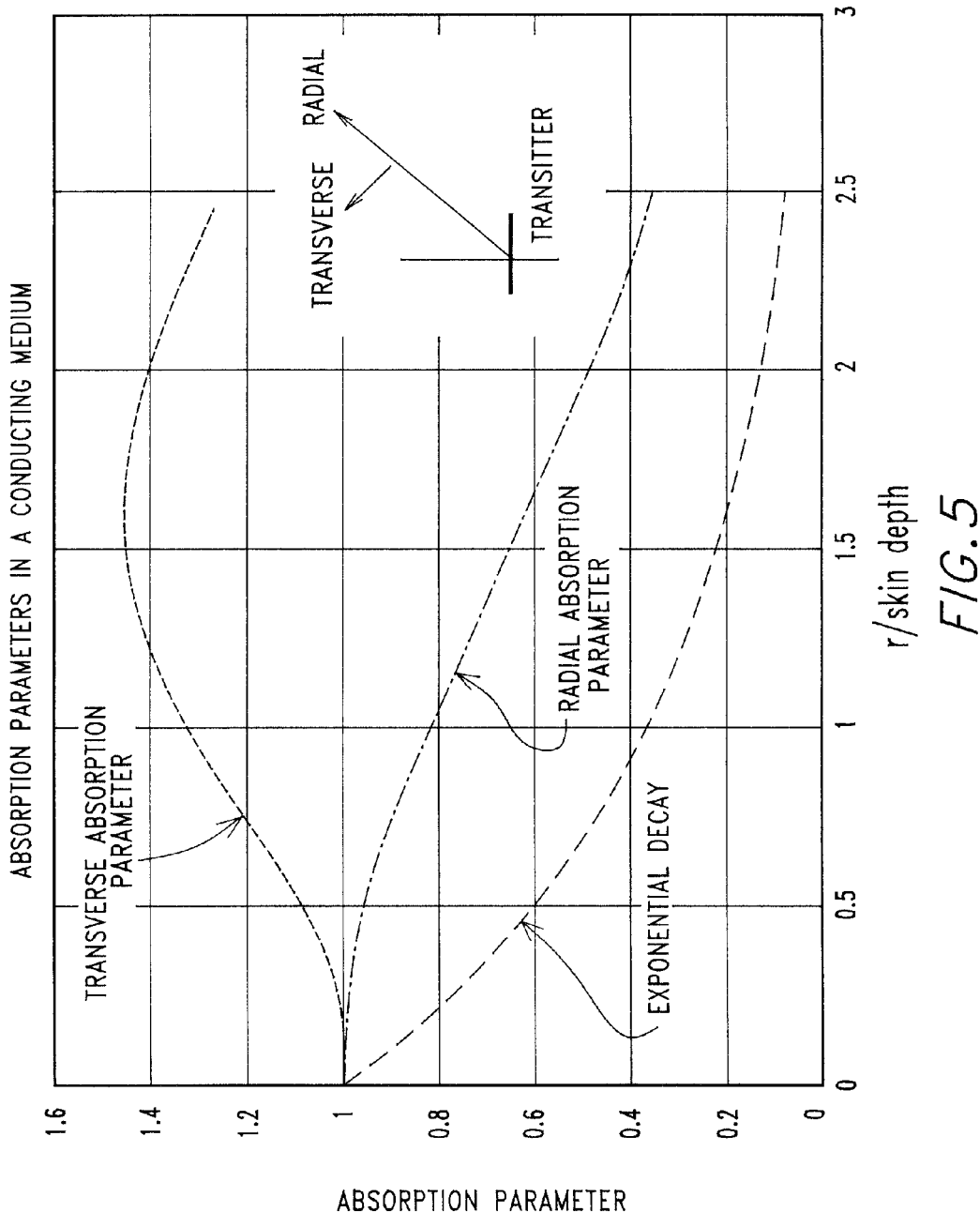
FIG. 5 is a plot of transverse and radial absorption parameters against the ratio of range to skin depth, shown here to illustrate the nature of these absorption parameters with increasing range to skin depth ratios.

Referring to FIG. 5, transverse and radial absorption parameters are shown plotted against the ratio of range, r, to skin depth, δ, based on the Rorden expressions for these values. Exponential decay is shown for comparison. It is of interest here to note that Rorden fails to provide a plot such as that of FIG. 5 and, even though Rorden lists the equations, he fails to observe that the transverse and radial components are each affected in a different way as r/δ increases. Both components, however, approach exponential decay asymptotically for large values of r/δ. At the same time, it is important to understand that the usefulness of the Rorden teachings is inherently limited, in a practical sense, because the presence of a ground surface is not modeled. As will be seen, the present invention resolves the difficulties in using locating signals having frequencies sufficiently high for providing ease of detection and adequate data transfer rates using the locating signal as a carrier while providing effective and highly advantageous compensation for skin effect, even though the locating frequencies used are high enough to encounter levels of skin effect that should not be ignored.

In one implementation of the present invention, which is applicable to essentially any underground boring system including systems 10 and 40 described above, the recognition must be emphasized that the locating field is governed by the cubic law of a magnetic dipole if the signal frequency goes to zero, because the skin depth goes to infinity regardless of the conductivity of the earth. At first blush, this recognition may seem of little importance to one of ordinary skill in the art since, as a practical matter, static magnetic fields (i.e., at zero frequency) are useless in the present application. That is, only a time varying field is readily measurable with sensitive detectors such as coils. However, the present invention overcomes the seeming uselessness of attempting a solution at zero frequency by providing a highly advantageous multi-frequency approach which allows the formulation of a zero frequency solution. Moreover, the multi-frequency approach taken by the present invention may readily be implemented using existing technologies, as will be seen immediately hereinafter.

The multi-frequency approach of the method of the present invention requires transmission and reception of the locating field using at least two different frequencies. While specific implementations to be described rely on the use of four different frequencies, it is to be understood that any number of frequencies of two or more may be employed. To some extent, it is considered that accuracy may be enhanced, however, when more than two frequencies are used. Details regarding frequency selection will be provided at an appropriate point below. In the four frequency implementation under discussion, measurement of the locating field is made at one or more above ground locations using either one or more detectors configured for use at fixed locations and/or using a portable walkover locator. Receivers in either a portable walkover locator or in fixed position above ground detectors may be configured in essentially the same manner, in accordance with these teachings. During operation of any system utilizing the multi-frequency approach of the present invention, measurements are made at the above ground locations corresponding to each of the selected frequencies. Thereafter, these measurements are utilized in a highly advantageous way which serves to extrapolate a zero frequency measurement. For example, it may be assumed for any particular above ground location that the component of the magnetic field intensity of the locating signal measured at the i-th frequency $f_i$ depends on skin depth according to:

$$S_i = S_0 F\left(\frac{D}{\delta_i}\right) \qquad (6)$$

where $S_0$ is a constant which corresponds to the intensity of the locating field at zero frequency, $\delta_i$ is the skin depth at each of the selected frequencies, D is the depth or some characteristic length scale of the boring tool and F is a function to be determined. Thus, the objective is to establish the value of $S_0$ based on the values $S_i$. To that end, for each of the selected frequencies, an interpolation polynomial or any other suitable mathematical function including an exact solution, if obtainable, may be used to provide a curve fit to the measured data for each of the frequencies. As an example, a cubic polynomial can be used to approximate the function, F, at the four required frequencies. Introducing the definition of skin depth, the magnetic field intensities can be written as:

$$S_1 = S_0 + af_1^{0.5} + bf_1 + cf_1^{1.5} \qquad (7)$$

$$S_2 = S_0 + af_2^{0.5} + bf_2 + cf_2^{1.5} \qquad (8)$$

$$S_3 = S_0 + af_3^{0.5} + bf_3 + cf_3^{1.5} \qquad (9)$$

$$S_4 = S_0 + af_4^{0.5} + bf_4 + cf_4^{1.5} \qquad (10)$$

Equations 7-10 are a set of linear equations for the unknown coefficients $S_0$, a, b and c that can be solved employing standard solution methods. It should be noted that this approach is very efficient numerically, requiring a small matrix to be inverted with coefficients depending on the chosen frequencies. Once a value for $S_0$ is obtained, the position of the boring tool can be determined using the well known cubic equations 1-4 above. Remarkably, there is no need to determine the skin depth values $\delta_1$. Since the selected frequencies are chosen prior to initiation of drilling, the inversion of this matrix need only be performed once. Other formulations of signal strength at each frequency, $S_i$, may be used. For example, one possible formulation may be based on the exact solution of Rorden in which exponential decay is observed for large values of r/δ, the equations may be expressed in the form:

$$S_i = S_0 e^{-\frac{r}{\delta_i}} G\left(\frac{r}{\delta_i}\right) \qquad (11)$$

$$S_i = e^{-cf_i^{0.5}}(S_0 + af_i^{0.5} + bf_i) \qquad (12)$$

where G is a function to be determined and all other values are described above. It should be noted that this approximation also requires measurements at four frequencies but the four resulting equations for unknown coefficients $S_0$, a, b, c are nonlinear. Hence, the solution method is somewhat less efficient than one based on polynomial approximations, but remains applicable over a wider range of skin depth. Once again, there is no need to determine the values $\delta_i$.

Figure 6:
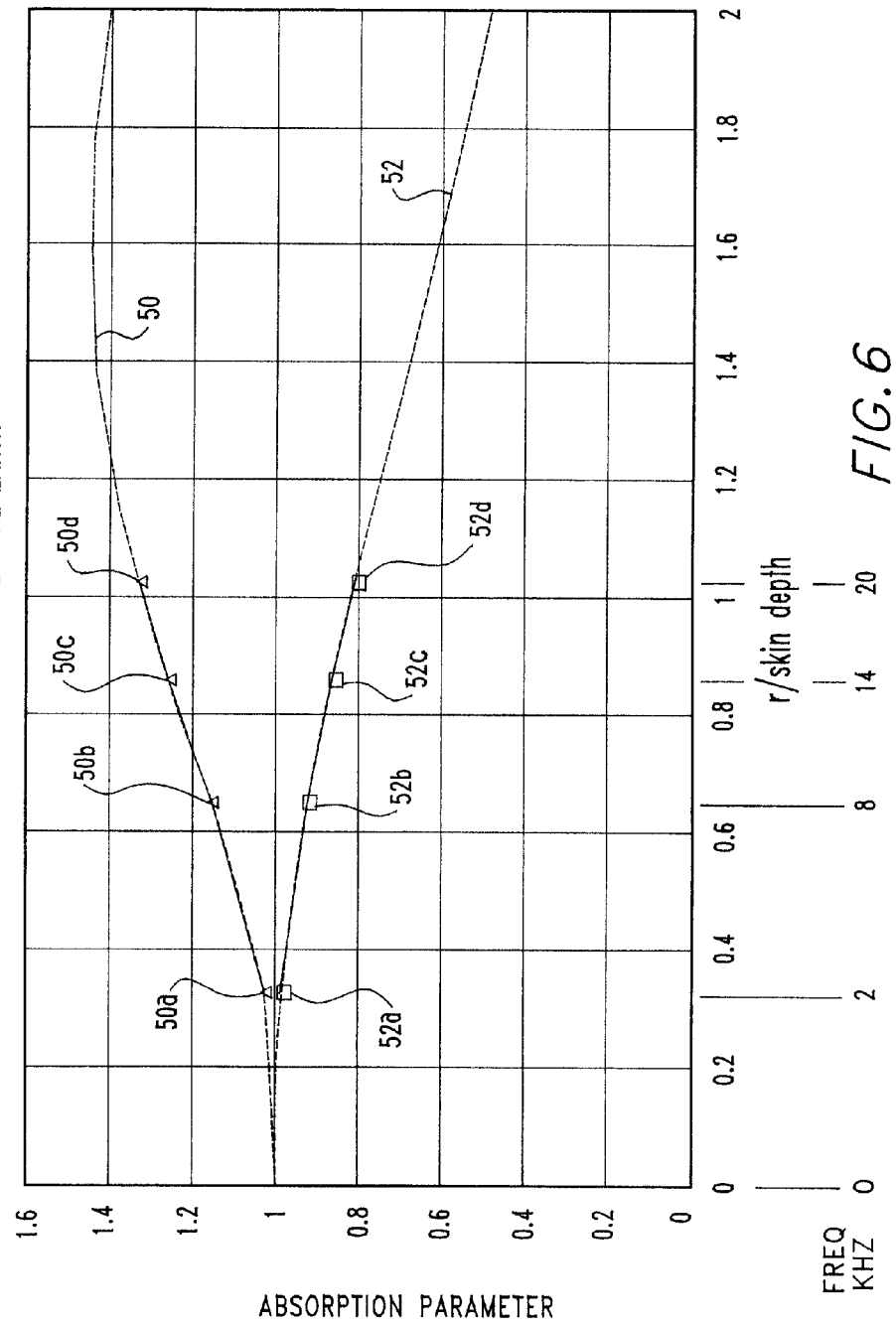
FIG. 6 is a plot of absorption parameters versus the ratio of range to skin depth for rich agricultural earth extending to infinity in all directions, shown here to illustrate selected points on the absorption parameters for use in validating the multi-frequency approach of the present invention.

Referring to FIG. 6, an important feature of the multiple frequency approach of the method of the present invention resides in the fact that it does not require knowledge of earth properties or ground surface geometry. The components of the magnetic field measured at nonzero frequencies contain property and geometry effects and pass them on to extrapolated zero frequency values. FIG. 6 demonstrates the validity of this approach for a simplified case, rich agricultural earth (i.e., meaning higher conductivity soil) extending to infinity in all directions. In this example, any variations of earth conductivity and the effect of ground surface and air on the magnetic field are neglected. The transverse and radial absorption parameters, representing the deviation of the magnetic field from the cubic law of magnetic dipoles, are plotted vertically against the ratio of range to skin depth as dashed lines indicated by the reference numbers 50 and 52, respectively. Points 50a-d and 52a-d have been selected on each absorption parameter curve corresponding to transmitter frequencies of 2, 8, 14 and 20 kHz, respectively. As seen, extrapolation of the curve using the polynomial formulation of equations 7-10 provides magnetic field data that are within 2% of known exact values for the absorption parameters at zero frequency (i.e., the known value of 1.0 for both of the absorption parameters at zero frequency). In the method of the present invention, the extrapolation is performed for magnetic intensity, however, the present example serves to illustrate the validity of this approach even though the absorption parameters were extrapolated since magnetic intensity is the product of the cubic law and absorption parameter. Even though the discussion dealt with distributed conductivity of soil, the multiple frequency approach will work for other field distortions due to conductivity including but not limited to buried electrical conductors, pipes, plates and rebar.

With regard to selection of frequencies at which the locating signal is to be transmitted, it is noted that an unlimited number of different frequency combinations may be employed. Since an extrapolation to zero frequency is being performed, however, it is considered that the frequencies should be as low as possible while still providing for adequate detection and transmission of data, using the locating signal as a carrier. For example, frequencies in the range of 2-40 kHz are considered as acceptable.

Figure 7:
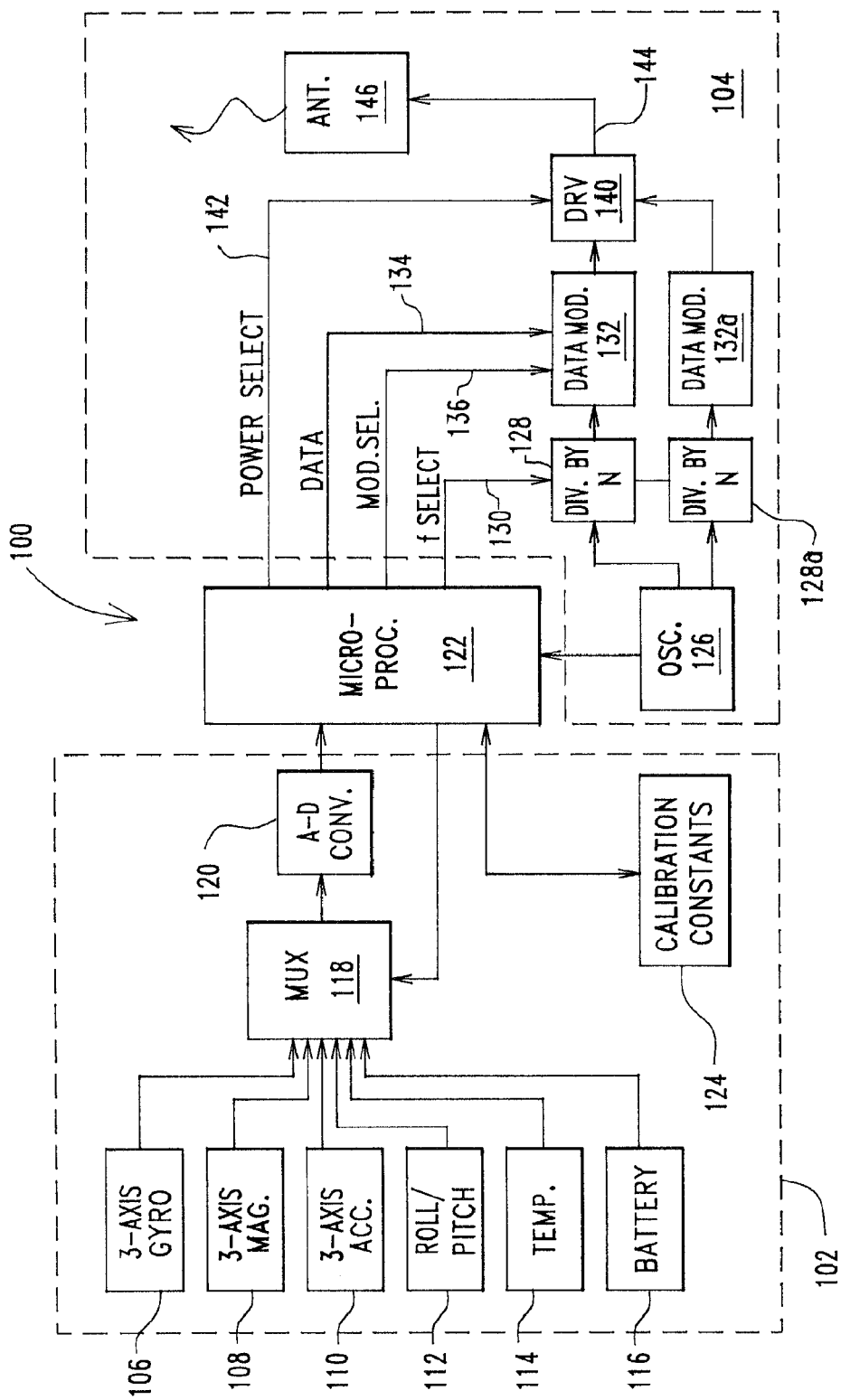
FIG. 7 is a block diagram illustrating a multi-frequency transmitter manufactured in accordance with the present invention and suitable for use in a boring tool.

Referring now to FIG. 7, having described the multi-frequency approach of the method of the present invention, descriptions will now be provided of components appropriate for use in systems which utilize the approach. FIG. 7 illustrates a multi-frequency transmitter manufactured in accordance with the present invention and generally indicated by the reference number 100. Transmitter 100 includes a sensor/conditioning section 102 and a carrier generation/antenna drive section 104. Transmitter 100 is generally configured for use in a boring tool, in certain instances, the transmitter may be used in above ground applications such as, for example, in a calibration and/or system test unit (not shown).

Still referring to FIG. 7, sensor/conditioning section 102 includes a suitable group of sensors in this instance comprising, for example, a three-axis gyro 106, a three-axis magnetometer 108, a three-axis accelerometer 110, a roll/pitch sensor 112, a temperature sensor 114 and a battery sensing section 116. Physical parameters at the outputs of magnetometer 108, accelerometer 110 and roll/pitch sensor 112, as well as the transmitter battery conditions using battery sensing section 116 and temperature using temperature sensor 114, are provided to a multiplexer 118 which then transfers all of these signals in multiplexed form to an analog to digital converter 120. The latter digitizes and converts the multiplexed signals into digital format, for example, at either an 8-bit or 12-bit resolution, depending on accuracy requirements. Thereafter, a microprocessor 122 processes all of the parameters provided from the analog to digital converter and converts the parameters into information relating to the in-ground transmitter coordinates or relating to down-hole conditions. For example, during this parameter processing, the microprocessor may perform linearization and temperature compensation on the output of roll/pitch sensor 112 in order to calculate an absolute pitch position of the boring tool. The pitch output may further be compensated based on the determination of a particular roll position. Linearization and compensation coefficients are generated during factory calibration and stored in a calibration constant section 124 which comprises a non-volatile memory area within transmitter 100. It is noted that programming of microprocessor 122 is considered to be within the ability of one having ordinary skill in the art in view of this overall disclosure.

Once the calculations are complete relating to all of the signals from sensors in sensor/conditioning section 102, the results are transmitted to one or more above ground locations. To that end, carrier generation/antenna drive section 104 includes an oscillator 126 which provides a clock signal to microprocessor 122 and to a divide by N counter 128. The latter receives a frequency select input from microprocessor 122 on an f select line 130 such that the divide by N counter may selectively generate any one of a wide range of carrier frequencies. The carrier frequency may be selected by microprocessor 122 under software control in a number of different ways. In one configuration, frequency selection can be performed at the beginning of the drilling operation, for example, after monitoring of background noise levels at various frequencies such that noisy frequencies may be avoided. Such noisy frequencies may be attributed, for instance, to traffic loops, invisible dog fences, cable TV, and power lines in a particular region. In another configuration, the transmitter may change frequencies on the fly, after the drilling has started. On the fly frequency change can be initiated either by the microprocessor using a pre-determined algorithm, or by the request of the drilling operator, for example, using a signal transmitted by telemetry from the surface to the boring tool or transmitted through the drill string using an isolated electrical conductor or based on possibilities such as, for example, boring tool roll orientation sequence and roll rate. Particularly advantageous arrangements for automatically forming an isolated electrically conductive path between the drill rig and an in-ground device such as a boring tool to provide power and signal paths are disclosed in co-pending U.S. patent application Ser. No. 09/317,308 which is incorporated herein by reference.

The selected carrier frequency is then passed to a modulation section 132 which is configured for modulating data from sensor/conditioning section 102 onto the selected carrier frequency. Modulation section 132 receives the data on a data line 134 from microprocessor 122 and also receives a modulation selection signal on a mod select line 136 connected with the microprocessor. The modulation selection signal may select, for example, phase modulation or amplitude modulation, or combinations of both. The modulation scheme may be programmed either before or during the drill, much in the same manner as in the case of the carrier frequency, described above.

With continuing reference to FIG. 7, data modulation section 132 passes a modulated carrier signal to a driver section 140. The driver section receives a power selection input on a power select line 142 from microprocessor 122. In this way, the output of transmitter 100 may be tailored to drilling conditions, for example, to conserve battery power in a shallow drill run or to increase transmitter output at longer ranges and/or drilling depths or even to stop transmission altogether during idle periods of a drilling operation. Control of the power as well as other functions can be achieved using procedures such as have been described for frequency control. The transmitter can send encoded data (as is done for roll, pitch and other parameters) to allow the receiver to adjust its calibration for the new signal strength. This will allow the operator to continue monitoring depth or range without the need to recalibrate while drilling. An antenna drive signal is produced on an antenna line 144 which is coupled to an antenna 146 which generally comprises a dipole antenna for emanation of locating signal 24.

In accordance with the multi-frequency approach of the present invention, described above, transmitter 100 may alternately transmit one of four selected carrier frequencies from the boring tool. The carrier frequencies may alternate at any suitable rate such as, for example, 10 Hz and may be selected in accordance with considerations described previously. It should be appreciated that transmitter 100 is configured for flexibility in carrying out the method of the present invention. That is, fewer or more than four carrier frequencies may readily be transmitted either individually or simultaneously.

Figure 8:
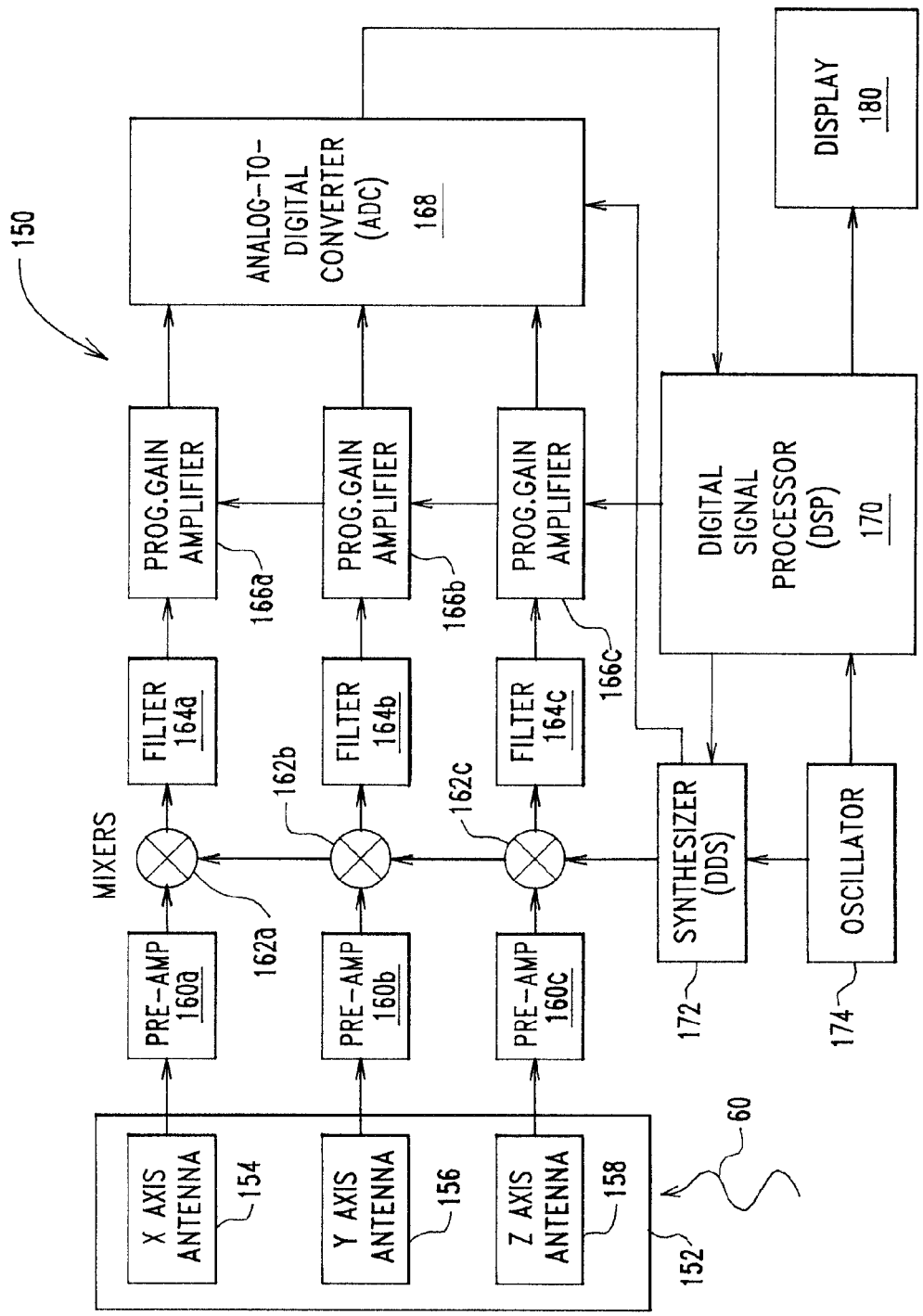
FIG. 8 is a block diagram illustrating a multi-frequency receiver manufactured in accordance with the present invention and suitable for use in a portable walkover detector or fixed position detector.

Turning now to FIG. 8, a multi-frequency receiver manufactured in accordance with the present invention is generally indicated by the reference number 150. Locating signal 60 is received by an antenna arrangement 152 which may include three orthogonally arranged x, y and z antennas indicted by reference numbers 154, 156 and 158, respectively. The locating signal received by each antenna is first amplified by respective very low noise pre-amplifiers 160a-c prior to processing. This pre-amplification maintains the received signal-to-noise ratio while making any noise introduced by subsequent circuitry relatively negligible. The amplified antenna signals (not shown) are then fed to mixers 162a-c to be translated down to a lower intermediate frequency (IF). In this manner, any locating signal frequency within a suitable design range such as, for example, 2-40 kHz can be received through appropriate adjustment of the frequencies of the mixers such that outputs of the mixers fall within a selected IF band.

Still referring to FIG. 8, the mixers are followed immediately by narrow-band, band-pass filters 164a-c which essentially pass only the locating signals at the translated IF frequency. The IF frequency can be either the sum or the difference of the carrier frequency and the mixer frequency. The filtered x, y and z signals are further amplified by programmable-gain amplifiers (PGA's) 166a-c before being received by an analog-to-digital converter 168. PGA's 166 provide over 96 dB of dynamic range and are each directly controlled by a digital signal processor (DSP) 170. One suitable DSP is the ADSP2185L, a sixteen bit fixed point DSP manufactured by Analog Devices, Inc. Analog-to-digital converter (ADC) 168 digitizes the received signals, at a rate controlled by a direct digital synthesizer (DDS) 172 which is, in turn controlled by DSP 170. The DSP and DDS receive an oscillator signal from an oscillator 174. Using the oscillator signal and based on control from the DSP, the DDS generates a local oscillator frequency (LO) for mixers 162. The ADC digitizes the received signals at the rate determined by the DDS and converts the signals to a binary number two's complement format. The conversion rate is either four times the IF frequency, if a quadrature sampling scheme is used, or may be significantly less than the IF frequency, if an undersampling scheme is chosen. The resolution of the ADC may be 12-bit to 16-bit. All axes are simultaneously sampled in order to maintain relative phase.

Continuing to describe receiver 150, digital signal processor DSP 170, controls all operations of the receiver including mixing frequency, PGA gain, and a selected signal processing algorithm. In the case of a quadrature sampling scheme, the DSP samples the received signals at four times their IF (translated) frequency and then multiples the received signals it by a separate Sine and Cosine sequence to obtain in-phase and quadrature-phase components. This process converts the received signal from its IF frequency down to a base-band frequency that contains modulated data, if present, while, at the same time, breaks down the signal into its in-phase (I) and quadrature-phase (Q) components. The I and Q components are each passed through a simple low-pass filter (not shown) to remove everything but the modulated data. The filtered outputs are then used to obtain the original data as well as further processing to recover signal magnitude and sign information. Additionally, the outputs are also used, along with a modified phase-lock-loop technique known as Costas loop, for controlling the DDS frequency (which controls the mixer frequency and ADC sample rate) and the PGA gain settings. The exact algorithm varies depending on the modulation scheme used but may be developed by one having ordinary skill in the art in view of this overall disclosure.

If under sampling (not shown) is used, the DSP would sample the received signals at a rate much lower than the IF frequency. The digitized data is then processed using a match filter to obtain data, magnitude, and sign information as well as for PGA gain control. Irrespective of sampling, the DSP implementation is considered to be highly advantageous, resulting in a very flexible and adaptive multi-frequency receiver. Many modifications (not shown) are possible in view of this disclosure for purposes of performance improvement. For example, mixers 162 can be eliminated by replacing narrow-band band-pass filters 164 with broadband band-pass filters and using ADC 168 to perform quadrature sampling and direct-to-base-band conversion (digital mixing) in a single operation. In order to receive the locating signal at different frequencies, DSP 170 may either sample the data at different rates or sample everything at a single, fixed rate and then perform rate conversion in software using decimation and interpolation techniques (known as digital re-sampling). As mentioned previously, it should be appreciated that receiver 150 may readily be incorporated into either a portable walkover locator or into detectors designed for use at fixed positions with a drilling region.

Having described a highly advantageous multi-frequency approach for use in skin depth compensation, skin depth compensation techniques using a single frequency locating signal will now be described with regard to a number of different exemplary scenarios. It is to be understood that existing systems using portable locators may readily be adapted in conformity with these teachings or, alternatively, new systems using either a portable locator and/or one or more locating field detectors designed for positioning at fixed locations within a drilling region are also readily adaptable in view of these teachings.

Figure 9:
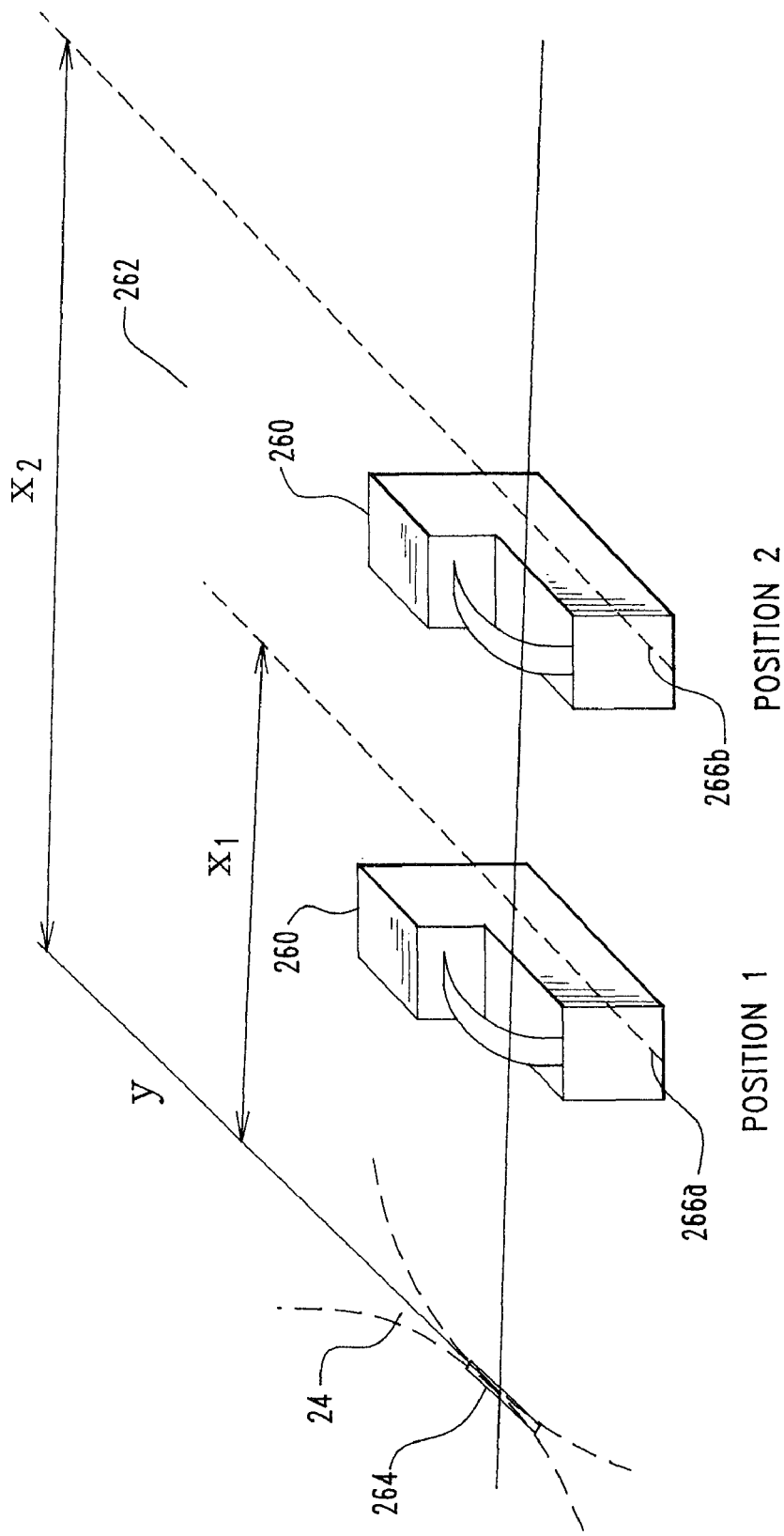
FIG. 9 is a perspective view of the surface of the ground on which a calibration procedure is being performed for determination of skin depth in accordance with the present invention using a portable walkover detector.

Referring now to FIG. 9, the techniques disclosed herein for use with single frequency locating signal transmission initially rely on a determination of the skin depth in the drilling region. As mentioned previously, some prior art systems utilize an above ground calibration procedure in an attempt to relate the signal strength of a dipole transmitter to distance without skin depth compensation. The present invention introduces a technique for performing an above ground calibration procedure which not only provides dipole signal strength, but also yields a value for skin depth in the drilling region which may be used in subsequent position determination techniques accounting for skin depth. FIG. 9 illustrates a calibration procedure being performed using a portable walkover detector 260 in a region 262. The calibration procedure is performed on the surface of the ground which is assumed to be planar for purposes of simplicity, having x and y coordinate axes defined as shown. A dipole transmitter 264 is diagrammatically illustrated and is oriented along the y axis while being centered upon the x axis. Preferably, the transmitter should be the transmitter which is to be used during subsequent drilling operations in a drilling configuration such as housed in the drill head (not shown) placed on the surface of the ground. Alternatively, the transmitter itself may be positioned on the ground, but it must be remembered that measurements are likely to be affected by any housing later positioned around the transmitter.

Still referring to FIG. 9, the calibration procedure is performed with the walkover locator at two offset positions along the x axis indicated by the reference numbers 266a, corresponding to an offset distance of x1, and 266b, corresponding to an offset distance of x2. Transmitter 264 transmits locating signal 24 at a single frequency. It is to be understood that the calibration procedure may just as readily be performed using a detector which is intended for location at a fixed position within the drilling region following the calibration procedure. In this regard, irrespective of the specific form of the detector instrument to be used in the calibration procedure, the instrument should be positioned such that its locating field sensor arrangement is on the x axis. In the instance of a walkover locator having an antenna configuration as described, for example, in above referenced U.S. Pat. No. 5,337,002, which is commonly assigned with the present application, the plane of the antenna arrangement should be aligned parallel to the y axis of the transmitter. In the instance of a locating field detector including three orthogonal receiving axes, such as described in above incorporated U.S. Pat. No. 6,035,951 the detector arrangement is somewhat arbitrary since signals measured along the three axes can be transformed mathematically into any desired directions.

Using the configuration shown in FIG. 9, the calibration procedure is performed by measuring the components of the magnetic flux intensity $B_{y1}$ and $B_{y2}$ at positions $x_1$ and $x_2$, respectively. Geophysical theory provides an equation for the calculation of dipole strength and skin depth that has the general form:

$$B_y = B_y(x, y, m, \delta) \tag{13}$$

where $B_y$ is a measured intensity, x and y are the coordinates of the locator/detector, m is the signal strength of the dipole transmitter and $\delta$ is the skin depth. At this time, a preferred method is based on the theory of Wait et al (Journal of Geophysical Research, Vol. 58, No. 2) which is valid for zero transmitter pitch, level ground surface and homogeneous soil conditions, as are present in FIG. 7. Wait solves Maxwell's equations with boundary conditions at the ground surface correctly satisfied. Since the calibration procedure provides two values of magnetic flux intensity and the distances $x_1$ and $x_2$, two nonlinear equations for calculating m and $\delta$ are obtained:

$$B_{y1} = B_y(x_1, 0, m, \delta) \tag{14}$$

$$B_{y2} = B_y(x_2, 0, m, \delta) \tag{15}$$

Figure 10:
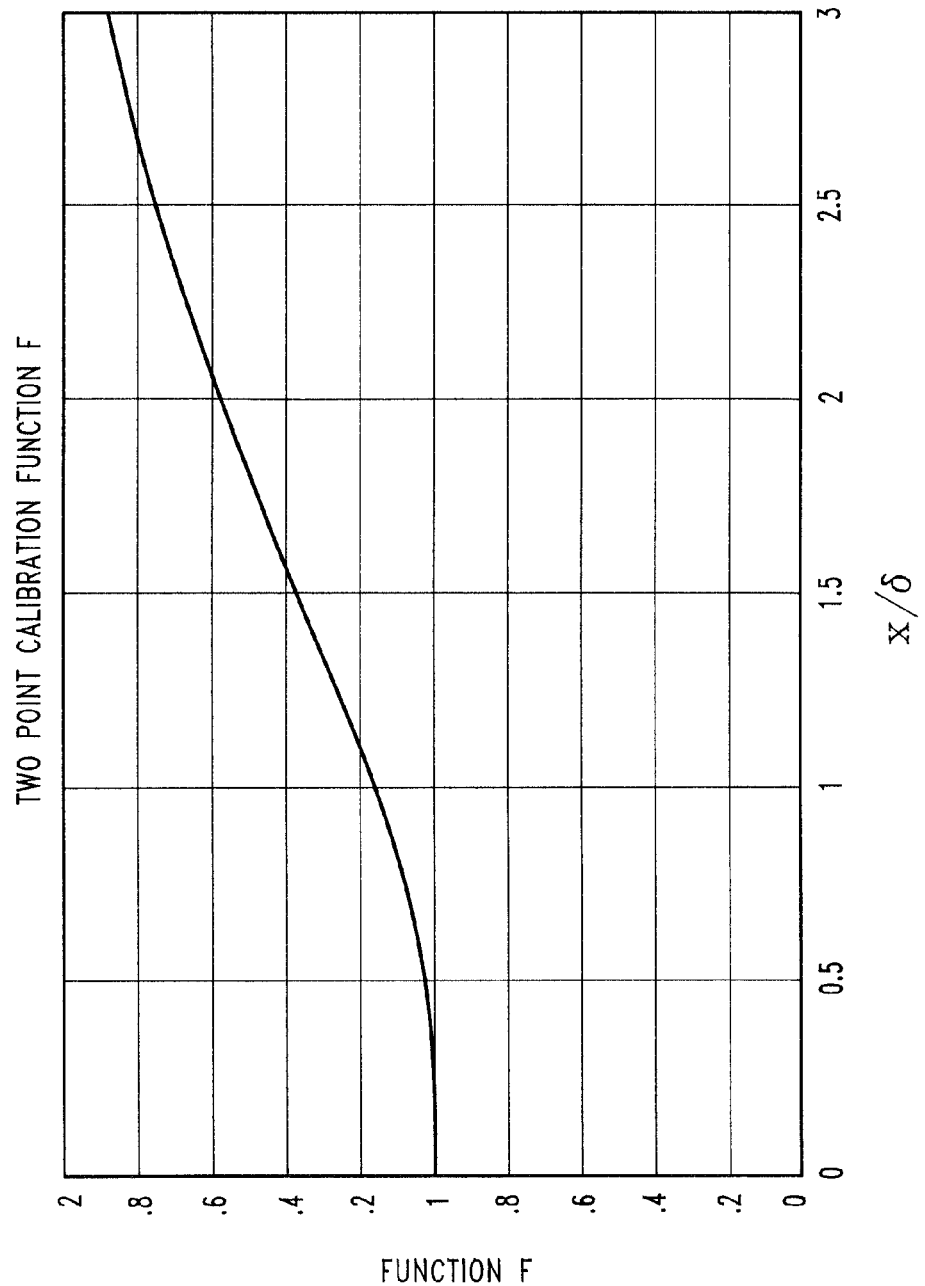
FIG. 10 is a plot illustrating a two point calibration function F.

The deviation of $B_y$ from the cubic law is approximated in the range $0 \le x/\delta \le 3$ by:

$$B_y = \frac{m}{x^3} F\left(\frac{x}{\delta}\right), \text{ and} \tag{16}$$

$$F\left(\frac{x}{\delta}\right) = 1 + b\frac{x}{\delta} + c\left(\frac{x}{\delta}\right)^2 + d\left(\frac{x}{\delta}\right)^3 \tag{17}$$

where the function F is shown in FIG. 10. The unknown coefficients b, c and d can be obtained from this graph using standard numerical techniques.

Using equations 16 and 17, the following equations can be obtained which can be solved for m and $\delta$:

$$B_{y1} = \frac{m}{x_1^3}\left[1 + b\frac{x_1}{\delta} + c\left(\frac{x_1}{\delta}\right)^2 + d\left(\frac{x_1}{\delta}\right)^3\right] \tag{18}$$

$$B_{y2} = \frac{m}{x_2^3}\left[1 + b\frac{x_2}{\delta} + c\left(\frac{x_2}{\delta}\right)^2 + d\left(\frac{x_2}{\delta}\right)^3\right] \tag{19}$$

The solution is obtained in 2 steps. First, the following variables are defined after introduction in equations 18 and 19:

$$g_1 = B_{y1} x_1^3 \tag{20}$$

$$g_2 = B_{y2} x_2^3 \tag{21}$$

$$\varepsilon = \frac{1}{\delta} \tag{22}$$

Subtracting equation 19 from equation 18 provides equation 23 for $\epsilon$.

$$(g_1 x_2^3 - g_2 x_1^3)d\epsilon^3 + (g_1 x_2^2 - g_2 x_1^2)c\epsilon^2 + (g_1 x_2 - g_2 x_1)b\epsilon + g_1 - g_2 = 0 \tag{23}$$

Equation 23 can be solved employing a standard method such as Newton's to yield $\delta$. Thereafter, dipole strength, m, follows directly from:

$$m = \frac{B_{y1} x_1^3}{1 + b\frac{x_1}{\delta} + c\left(\frac{x_1}{\delta}\right)^2 + d\left(\frac{x_1}{\delta}\right)^3} \tag{24}$$

Thus, dipole signal strength, m, and skin depth, $\delta$, are established for use in subsequent position determinations.

Figure 11:
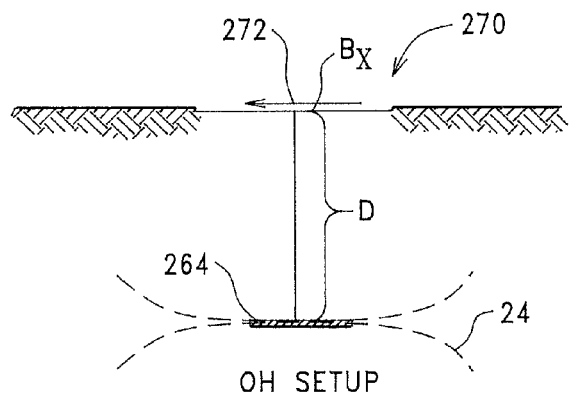
FIG. 11 is a diagrammatic elevational view of an overhead position determination setup, illustrating the determination of a skin depth corrected depth of the boring tool.

Turning now to FIG. 11, in a first scenario, an overhead position determination setup (hereinafter OH setup) is generally referred to by the reference number 270 with a detector (not shown) at a position 272 located directly overhead (hereinafter OH setup) of transmitter 264 transmitting locating signal 24. At this location, the flux lines of the magnetic locating field are characteristically horizontal substantially over the transmitter. The detector measures the horizontal component of the magnetic flux intensity $B_x$. With m and $\delta$ known from the foregoing above ground calibration transmitter depth and with a measured value of intensity, $B_{xD}$, from the detector, D, is determined from a single equation written symbolically as:

$$B_{xD} = B_x\left(m, D, \frac{D}{\delta}\right) \tag{25}$$

The exact form of equation 25 can either be obtained from geophysical theory or from dimensional analysis. Applying the latter (e.g., P. W. Bridgman, Dimensional Analysis, 1931) six variables are identified governing the physics of OH setup depth measurement. The variables include $B_x$, $\mu$, $\sigma$, $f$, $D$ and $m$ which have been defined previously. Furthermore, four fundamental units including length, time, volt, and ampere characterize the problem. Hence according to the $\pi$-theorem of dimensional analysis six minus four or two non-dimensional groups describe the OH setup measurements mathematically. The two non-dimensional groups include $$\frac{B_x D^3}{m} \quad (26)$$

$$\mu \sigma f D^2 \quad (27)$$

The second group given by equation 27 can be simplified to $D/\delta$ using the definition of skin depth from equation 5. Hence $B_x$ must be of the following general form:

$$B_x = \frac{m}{D^3} G\left(\frac{D}{\delta}\right) \quad (28)$$

Figure 12:
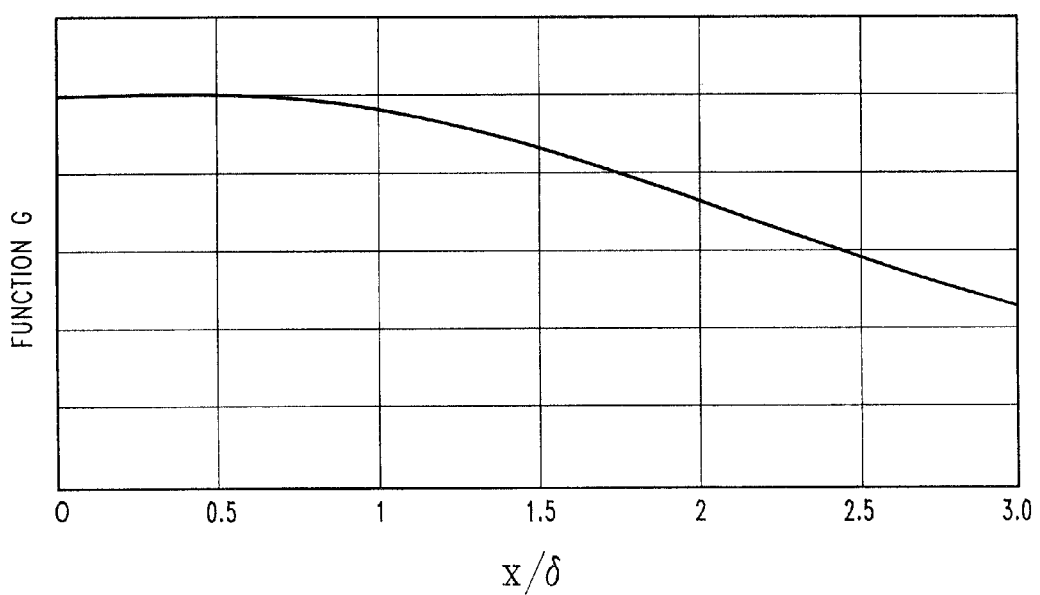
FIG. 12 is a plot representing the deviation from the cubic law obtained from a curve fit of Wait's theoretical results valid for a semi-infinite conductive region and zero transmitter pitch in the range $0 \leq D/\delta < 3$.

Here, the function G represents the deviation from the cubic law obtained from a curve fit of Wait's theoretical results valid for a semi-infinite conductive and zero transmitter pitch in the range $0 \leq D/\delta < 3$ medium, shown in FIG. 12. Since this equation is nonlinear for depth D, an iterative procedure must be formulated. As one example:

$$D = \left(\frac{m}{B_x} G\left(\frac{D}{\delta}\right)\right)^{\frac{1}{3}} \quad (29)$$

Function iteration/successive approximation is performed beginning with an initial guess for D, e.g. the value corresponding to infinite skin depth. In successive approximations, the procedure inserts the last available value for D on the right hand side of this equation thereby calculating a new, more accurate value. This process is repeated until changes between successive values of D are reduced to a specified tolerance.

The analysis outlined immediately above provides the correct functional relation between variables governing OH setup depth measurement which can be written as:

$$G\left(\frac{D}{\delta}\right) = \sum_{i=1}^{N} c_i \left(\frac{D}{\delta}\right)^{d_i} \quad (30)$$

The unknown coefficients $c_i$ and $d_i$ must be obtained from another source, for example, Wait's theory or a physical experiment conducted in different soil conditions and at various depths. Another method for obtaining these coefficients relies entirely on numerical modeling solving Maxwell's equations and pertinent boundary conditions. Computer codes are commercially available to aid in this task such as, for example, software by Infolytica Corporation in Montreal, Canada.

Figure 13:
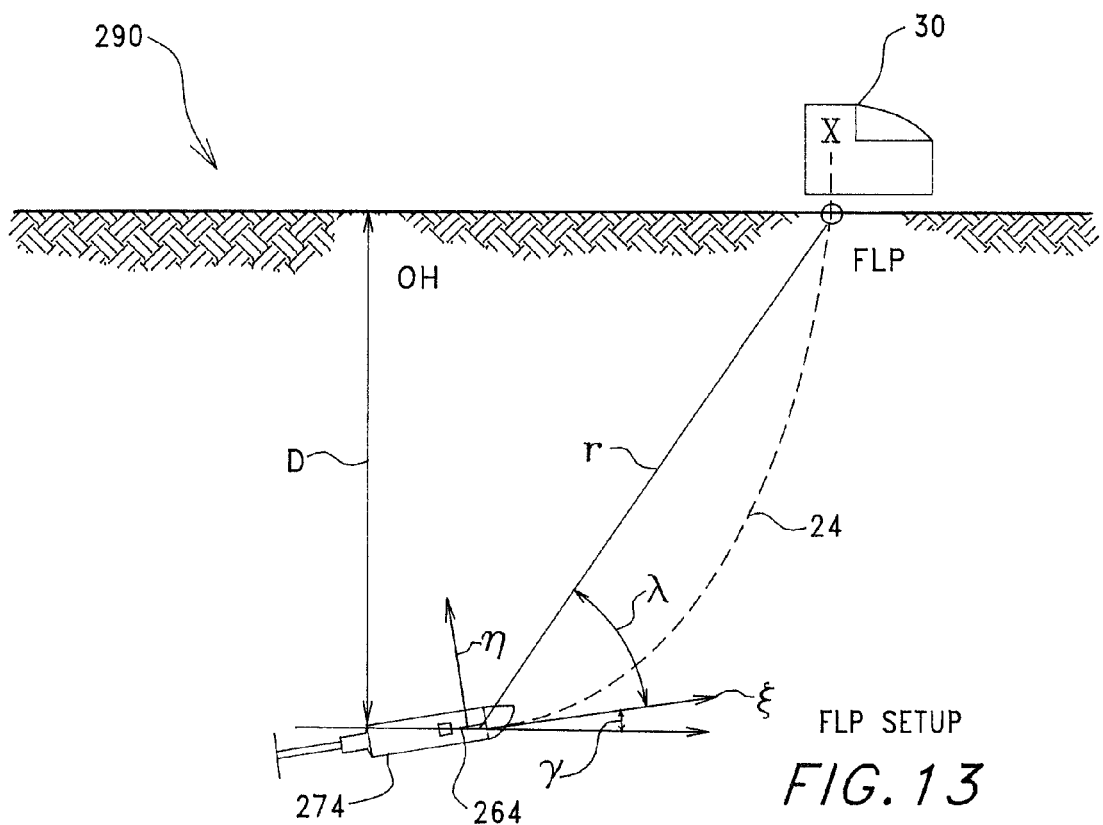
FIG. 13 is a diagrammatic elevational view of a forward locate position determination setup, shown here to illustrate determination of a skin depth corrected depth of the boring tool from the forward locate point.

Attention is now directed to FIG. 13 which illustrates a second scenario representing a Forward Locate Point position determination setup generally indicated by the reference numeral 290. It should be mentioned that even though the present discussions are made with reference to the forward locate point, these concepts are equally applicable to the rear locate point. In this instance, detector 30 measures the magnitude of the magnetic flux intensity B (not shown) as a result of locating signal 24 transmitted from transmitter 264 within drill head 274. In addition, transmitter pitch $\gamma$ is measured. In order to calculate transmitter depth from these measured quantities the following equations must be solved:

$$B_\xi = B_\xi\left(\xi, \eta, \frac{r}{\delta}\right) \quad (31)$$

$$B_\eta = B_\eta\left(\xi, \eta, \frac{r}{\delta}\right) \quad (32)$$

$$\tan\gamma = \frac{B_\xi}{B_\eta} \quad (33)$$

$$D = r\sin(\lambda + \gamma) \quad (34)$$

$$B_y = \sqrt{B_\xi^2 + B_\eta^2} \quad (35)$$

$$\tan\lambda = \frac{\xi}{\eta} \quad (36)$$

$$r^2 = \xi^2 + \eta^2 \quad (37)$$

The definitions of the geometric variables D, r, $\xi$, $\eta$, $\lambda$ are given in FIG. 13. It is noted that transmitter depth is the distance from the ground surface to the transmitter. Since the locator antennas measure signals above ground, the distance between the antennas and ground must be subtracted from the computed depth. These variables and the two components of the magnetic field intensity $B_\xi$ and $B_\eta$ make up a total of 7 unknowns that can be obtained from the listed seven equations using standard numerical methods. An example of a convenient solution method is to rewrite the equations in terms of polar coordinates r, $\lambda$ using $$\xi = r\cos\lambda \quad (38)$$

$$\eta = r\cos\lambda \quad (39)$$

This transformation eliminates two equations. The remaining equations then read:

$$B_\xi = B_\xi\left(r, \lambda, \frac{r}{\delta}\right) = \frac{3\cos^2\lambda - 1}{r^3} H_1\left(\frac{r}{\delta}\right) \quad (40)$$

$$B_\eta = B_\eta\left(r, \lambda, \frac{r}{\delta}\right) = \frac{3\sin\lambda\cos\lambda}{r^3} H_2\left(\frac{r}{\delta}\right) \quad (41)$$

$$\tan\gamma = \frac{B_\xi}{B_\eta} \quad (42)$$

$$B_y = \sqrt{B_\xi^2 + B_\eta^2} \quad (43)$$

$$D = r\sin(\lambda + \gamma) \quad (44)$$

Note that the equations for the components of magnetic field intensity express the cubic law of a magnetic dipole multiplied by a function $H_1$ or $H_2$ that accounts for the effect of skin depth. The latter is known from an above ground calibration, as described above. Details of these functions can be derived employing either geophysical theory or dimensional analysis. Further, note that equation 44 for transmitter depth is uncoupled from the other equations allowing independent solution for the position coordinates r and λ of the FLP based on the following nonlinear equations:

$$B_\eta\left(r, \lambda, \frac{r}{\delta}\right)\tan\gamma - B_\xi\left(r, \lambda, \frac{r}{\delta}\right) = 0 \tag{45}$$

$$B_y^2 - B_\xi^2\left(r, \lambda, \frac{r}{\delta}\right) - B_\eta^2\left(r, \lambda, \frac{r}{\delta}\right) = 0 \tag{46}$$

where the variables have been defined above. These equations can be solved employing any of the standard solution methods for sets of nonlinear equations such as, for example, Newton's and function iteration.

Figure 14:
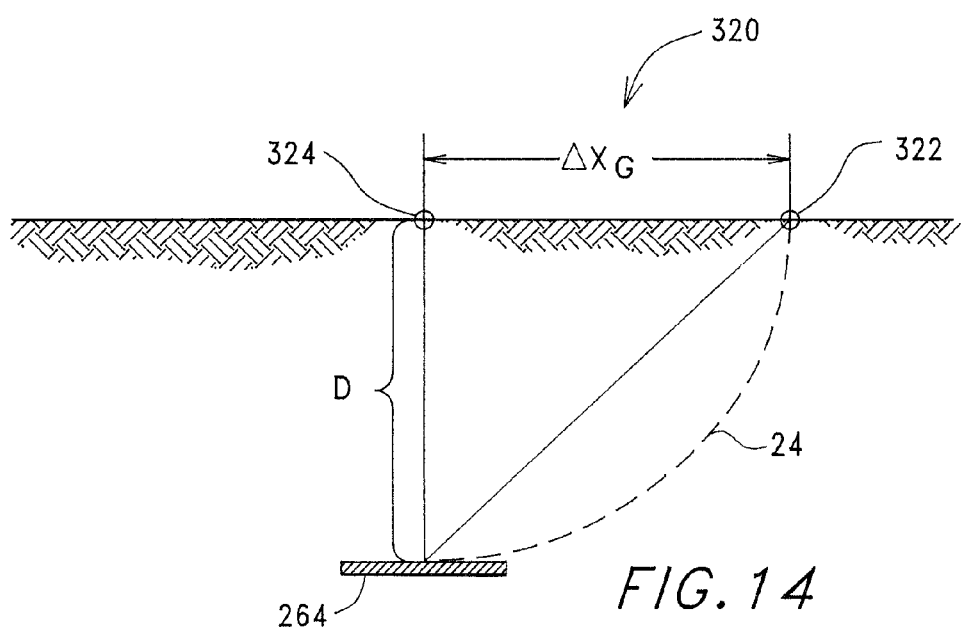
FIG. 14 is a diagrammatic elevational view of a surface offset distance position determination shown here to illustrate a variation in which an above ground measurement between the forward locate point and an overhead point directly above the boring tool is used in determining the skin depth corrected depth of the boring tool.

Turning now to FIG. 14, in a third scenario, a surface offset distance position determination setup is generally indicated by the reference number 320. This setup technique uses the FLP and OH points indicated by the reference numbers 322 and 324, respectively. In this regard, it is noted that the locations of these points are affected as a result of skin depth. At forward locate point 322, the horizontal component, $B_x$, of the magnetic flux intensity vanishes. This fact can be used to derive a formula for transmitter depth D as a function of a horizontal distance, $\Delta x_G$, at the surface of the ground between OH point 324 and FLP 322. In applications where skin effect can be neglected, a simple equation for depth, D, can be derived from the cubic law for a dipole field:

$$D = \sqrt{2}\Delta x_G \tag{47}$$

In order to account for skin effect relying on $B_x = 0$, a different form of the equation is used which is written in symbolic notation as:

$$B_x\left(\frac{r}{\delta}, \Delta x_G, D\right) = 0 \tag{48}$$

Here, skin depth δ is obtained from an above ground two-point calibration as described earlier and $\Delta x_G$ can be measured easily using available standard distance measurement methods. Details of this equation can also be derived from geophysical theory, e.g., the aforementioned work published by Wait. In general, an explicit formula for depth cannot be derived from this equation since it will most likely be nonlinear in D, therefore, the expression must be solved numerically employing a suitable standard solution method such as Newton's or function iteration.

Figure 15:
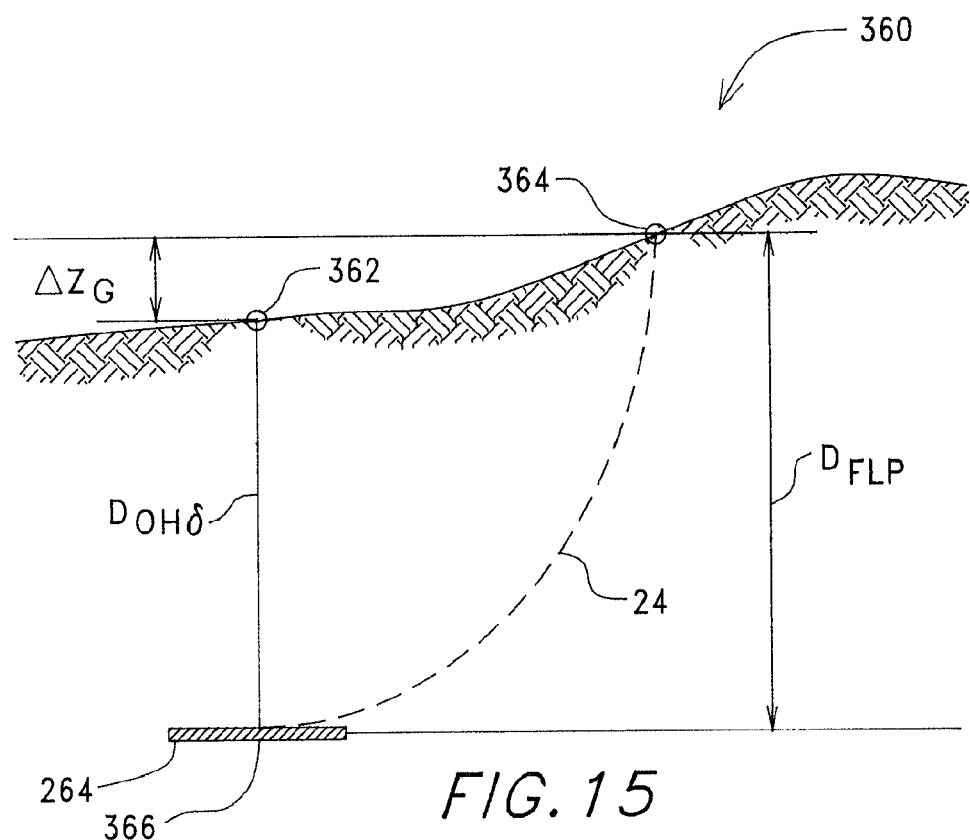
FIG. 15 is a diagrammatic elevational view of an above ground elevation offset distance position determination setup, shown here to illustrate still another variation in which a forward locate point skin depth correction factor is developed for use in subsequent drilling operations.

Attention is now directed to FIG. 15 which illustrates a fourth, above ground elevation offset distance position determination setup generally indicated by the reference number 360. This setup technique is useful in conjunction with an OH measurement of drill head depth, $D_{OH\delta}$, which accounts for skin depth such as, for example, described above in the OH position determination setup associated with FIG. 11. The elevation offset technique requires a measurement of elevation change, $\Delta z_G$, between an OH point 362 and a FLP 364 with transmitter 264 at one position 366. Generally, this measurement will be performed once early in a drilling operation. With the drill head at position 366, FLP-depth, $D_{FLP\delta}$, (wherein δ indicates compensation for skin depth) can be calculated from the over head depth, $D_{OH\delta}$, and the measured elevation change using:

$$D_{FNLP\delta} = D_{OH\delta} + \Delta z_G \tag{49}$$

Still referring to FIG. 15, the present technique is especially useful for a walk-over locator that is able to accurately measure over-the-head depth accounting for skin effect, but is not configured for skin depth compensation from the FLP. Since depth measured with such a locator at a forward locate point does not include skin effect, the ratio $D_{FLP\delta}/D_{FLP}$ obtained at transmitter position 366 can be employed to correct subsequent FLP depth measurements using the formula:

$$D_{FLP\varepsilon_k} = \left(\frac{D_{OH\delta} + \Delta z_G}{D_{FLP}}\right)_1 D_{FLPk} \tag{50}$$

Here, the subscripts 1 and k denote the first and k-th locating positions respectively. It should be noted that this correction is linear and hence can only be expected to give accurate results for small depth variations and homogeneous soil properties.

Figure 16:
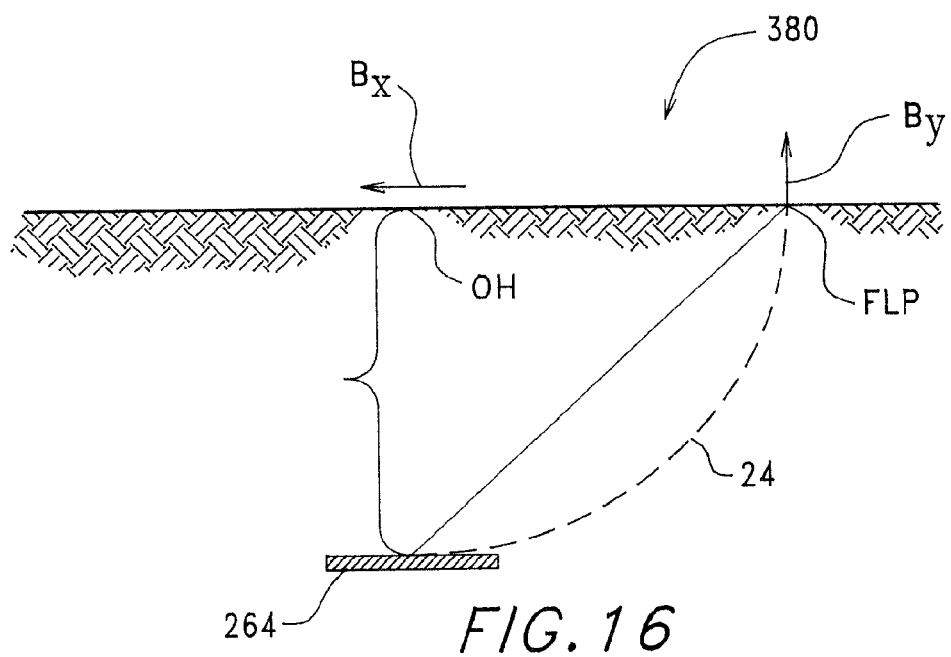
FIG. 16 is a diagrammatic elevational view of a dual point common elevation position determination setup, shown here to illustrate the use of two identifiable points having a substantially common elevation.

Referring to FIG. 16, a dual point common elevation position determination setup is generally indicated by the reference number 380. Accordingly, magnetic measurements are made at any two identifiable points having a common elevation. These measurements are combined to obtain transmitter depth in the presence of skin effects. It is assumed that ground elevation changes only moderately between these two points so that the same locator elevation can be maintained by simply raising or lowering the locator/detector unit relative to the surface of the ground. This approach does not require an above ground calibration since skin depth is determined from magnetic field data together with transmitter depth. Two such identifiable points are the OH and the FLP points, as indicated. At the OH location there is only a horizontal magnetic flux $B_x$ and at the forward locate point there is only a vertical flux component $B_y$. Even though transmitter 264 is shown in a level orientation in this figure, its pitch is not required to be zero. The governing equations have already been described above for techniques relying on separate OH and FLP measurements. Specifically, equations including (28) and (31) to (37) may be used for the solution of transmitter depth D, skin depth δ and the variables r, ξ, η, λ, $B_\xi$, $B_\eta$ defined above. An example of a practical solution method can be derived by modifying the approach given previously for solving the set of equations (31) to (37). There the method requires the simultaneous solution of the two nonlinear equations (42) and (43) for the geometric parameters λ and r. Here D, δ, λ and r are obtained by solving the 4 nonlinear equations (28), (44), (45) and (46) simultaneously employing any standard numerical solution methods such as Newton's and function iteration.

Referring once again to FIG. 7, multi-frequency transmitter 100 may be configured to transmit a locating signal at one or more carrier frequencies and/or power levels consistent with the foregoing disclosure. In addition to the reasons given above for varying the power and frequency parameters described above, still further highly advantageous reasons for varying these parameters will be described at appropriate points hereinafter.

Still referring to FIG. 7, it is assumed for purposes of the present example that transmitter 100 is configured for transmission of the locating signal at two different carrier frequencies. In this regard, calibration constants corresponding to these carrier locating frequencies, like any other locating frequencies, are measured and stored within calibration constants section 124. A number of provisions may be made for changing the locating frequency with the transmitter above ground and, subsequently, during drilling. With regard to the latter, as mentioned above, frequency of transmission may change or toggle, for example, based on boring tool roll orientation sequence or roll rate. That is, the boring tool may be moved by means of the drill string into a sequence of roll position orientations wherein the tool is held stationary in each of the target roll orientations. Alternatively, a roll sequence may be employed rather than using actual roll orientation positions, as will be further described.

Figure 17:
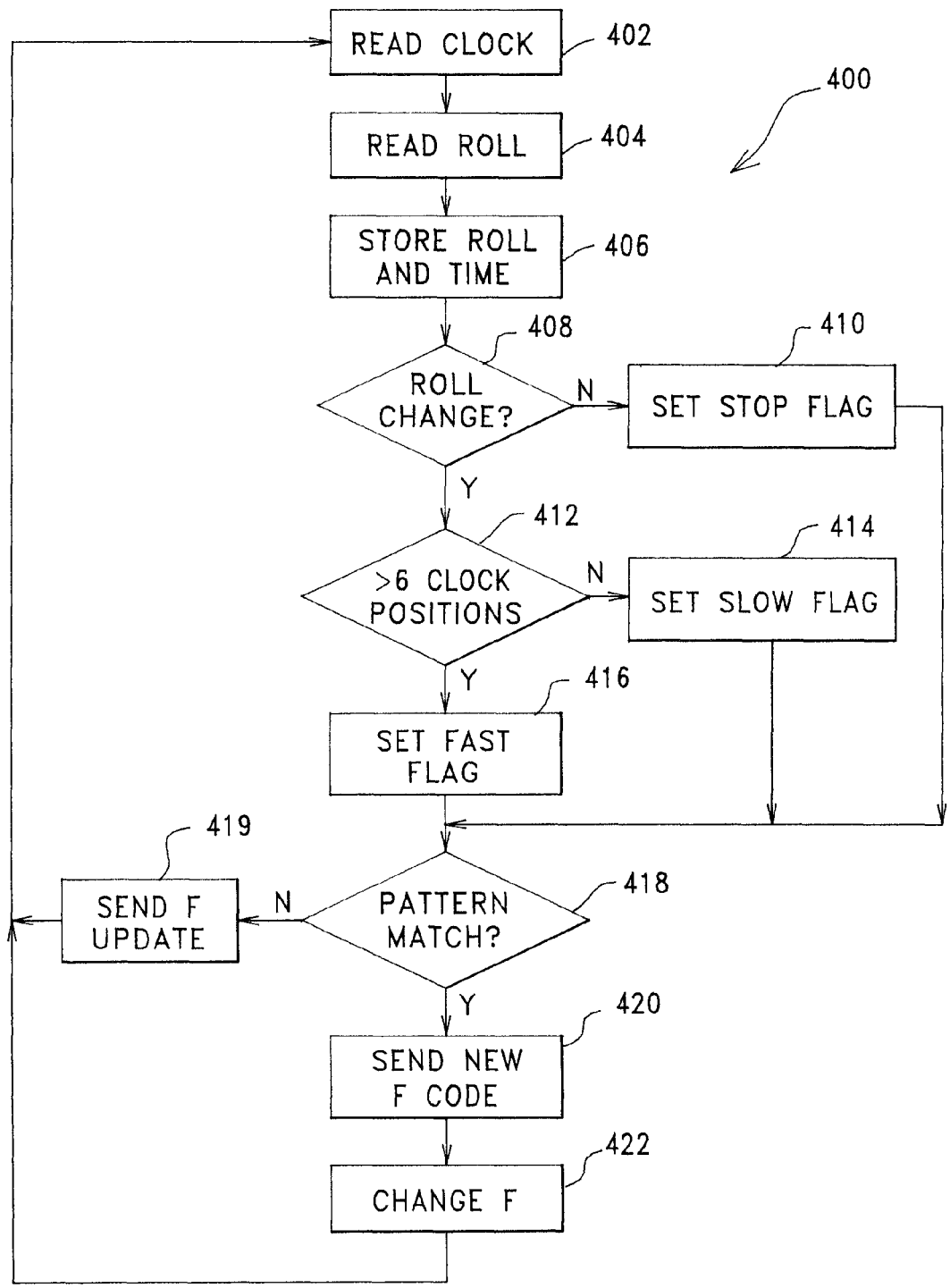
FIG. 17 is a flow diagram illustrating one implementation of a locating frequency command sensing and update method in accordance with the present invention.

FIG. 17 illustrates one highly advantageous method for initiating locating frequency change during drilling using a roll orientation sequence generally indicated by the reference number 400. Initially, step 402 of method 400 reads a clock which forms part of microprocessor 122. Step 404 then reads roll position as available, for example, from aforedescribed roll/pitch sensor 112 (FIG. 7). In step 406, the roll position and time of its recording are stored. The step 408 then compares the roll position, as just read, to the roll position that was recorded responsive to steps 404 and 406 on the last loop of the process therethrough, if available. If there is no change in roll position, the boring tool is not rotating such that step 410 is entered to set a stop flag. If, however, a change in roll position is indicated, step 412 is entered. This latter step tests for the roll rate. Specifically, if the change in roll position is less than six clock positions a slow flag is set in step 414. If, on the other hand, the detected changing clock position is greater than six clock positions, step 416 sets a fast flag.

After the execution of any of steps 410, 414, and 416, step 418 is executed, testing for a pattern match with reference to a saved or target roll sequence which may encompass positioning the boring tool at one or more stationary roll positions and/or rotating the boring tool at predetermined rates for predetermined periods of time. Suitable roll sequences for use in initiating frequency change of the transmitter should encompass some roll sequence that is not normally performed during typical drilling operations so as to avoid inadvertently toggling the frequency of the locating signal.

One suitable roll sequence includes (i) stopping rotation of the boring tool for a time duration of approximately 7 to 20 seconds, (ii) rolling the boring tool at a slow roll rate for a time duration of approximately 7 to 20 seconds and (ii) without stopping, immediately going into a fast roll rate for approximately 7 to 20 seconds. The difference between the fast and slow roll rates may be defined by the drill rig that is in use. Generally, however, a slow roll rate is on the order of approximately 10 to 30 rpm while a fast roll rate is greater than 30 rpm. Any defined fast and slow ranges of roll rate may be used so long as the ranges are separated sufficiently to provide for distinguishing therebetween.

Another suitable roll sequence includes positioning the boring tool at the roll positions of 4:00, 8:00 and 12:00 in three successive time intervals, each of which is approximately 7-20 seconds in duration. In this regard, it should be appreciated that factors such as the length of the drill string should be considered with regard to the use of such fixed roll orientations since "wrap-up" in a long string can, in some cases, cause difficulties in achieving a fixed roll position with precision.

Continuing with a description of step 418 the detected pattern of roll to which the boring tool has been subjected is compared to the target roll sequence that is used to initiate frequency toggling. In essence, the detected roll sequence or pattern is saved to allow microprocessor 122 to look back in time for a period that is longer than the longest acceptable target roll sequence. Thus, in the present example, each portion of the target roll sequence may be as long as twenty seconds such that at least sixty seconds of roll information should be saved. This information may comprise the states of stop, slow and fast flags recorded by steps 410, 414 and 416, respectively, indexed against time. Where step 418 does not detect a pattern match, execution moves to step 419 in which a frequency update is transmitted. This latter step is optional, depending upon the specific implementation of the transmitter. It is advantageous where a roll/pitch carrier continuously transmits data such as, but not limited to, roll data, pitch data and depth carrier frequency data on a frequency separate from the depth locating signal, as will be further described. Thereafter, operation returns to step 402 in order to continue the monitoring process. When step 418 does detect a pattern match, step 420 initiates transmission of a new frequency code which indicates to an above ground receiver that the transmitter is about to change transmission frequencies. This step will be described in further detail at appropriate points hereinafter. In step 422, the transmitter toggles its transmission frequency. It is noted for later reference that step 420 may be repeated one or more times immediately after performing step 422 depending upon the particular implementation of the transmitter. The foregoing steps, like all steps described throughout this disclosure, may be modified and/or varied in sequence in any suitable manner within the context of a particular implementation while remaining within the scope of the present invention.

As one alternative to subjecting the boring tool to a roll orientation sequence, signaling may be communicated to the boring tool using an isolated conductor carried within the drill string as described, for example, in above incorporated U.S. patent application Ser. No. 09/317,308 which is co-assigned with the present application.

Referring to FIG. 7, an ability to change the frequency of transmitter 100 is required not just during drilling, but also with the transmitter above ground, for example, to perform calibration procedures at each of the locating frequencies. The present invention contemplates a number of highly advantageous techniques for accomplishing frequency toggling with the transmitter above ground. In this regard, such techniques are most useful when the frequency toggle may be accomplished with the transmitter housed in the boring tool in its drilling configuration to facilitate calibration accuracy. As will be seen, these above ground techniques use reads of roll/pitch sensor 112 performed by microprocessor 122.

In one technique, the transmitter frequency is determined based upon transmitter pitch orientation on power-up of the transmitter. For example, when the transmitter is powered up having its forward end, as oriented toward the forward end of the boring tool when installed therein, directed generally upward (preferably vertically upward), the transmitter will begin transmitting at a higher one of the two available locating signal frequencies. When the transmitter is powered up having its forward end directed generally downward (preferably vertically downward), the transmitter will begin transmitting at a lower one of the two available locating signal frequencies. It should be appreciated that a pitch range within vertical at the time of power-up may be specified to initiate transmitting at either the low or high locating signal frequency. One suitable pitch range is considered to be within 45 degrees of a vertical orientation.

Another technique for accomplishing above ground toggling of transmitter frequency uses a pitch orientation sequence. For purposes of such above ground frequency toggling, the present invention recognizes that the boring tool may readily be subjected to pitch orientation sequences. Contemplated pitch orientation sequences are generally not possible during drilling. Like the aforedescribed roll sequences, a pitch orientation sequence is detected by using roll/pitch sensor 112. One contemplated pitch orientation sequence includes the step of initially placing the transmitter in a horizontal orientation for a time period in the range of approximately 7 to 20 seconds. The transmitter is thereafter placed in an approximately vertical orientation having the forward end of the transmitter pointing in a downward direction for approximately 7 to 20 seconds. A concluding step places the transmitter back into the horizontal orientation again for approximately 7 to 20 seconds. Responsive to exposure to this pitch orientation sequence, the transmitter will respond by toggling its locating frequency. Specific provisions relating to a receiver responsive to toggling of the transmitter locating frequency will be described below. Still further above ground frequency selection techniques may be developed within the scope of the present invention, particularly in view of the overall teachings herein.

With continuing reference to FIG. 7, data originating in sensor/conditioning section 102, including roll and pitch, may be transmitted in any suitable manner using transmitter 100 such as, for example, using tones that are modulated onto the locating signal. In this regard, Dual Tone Multi-Frequency (DTMF) encoding may be used. DTMF is discussed, for example, by U.S. Pat. No. 5,767,678 which is co-assigned with the present application and which is incorporated herein by reference. As one alternative, frequency shift keying may be employed. Control of divide by N counter, using microprocessor 122, provides for transmitting the data at any suitable frequency. Microprocessor 122 additionally executes any selected ones of the aforedescribed methods and techniques processes for toggling the transmitting frequency of the locating signal by monitoring roll/pitch sensor 112. In one embodiment, the carrier frequency for this data also serves as the locating signal. As will be further described, a sufficiently narrow band-pass filter (not shown) may be used within a receiver yet to be described to strip unwanted information from the carrier frequency so as to insure accurate locating.

In another embodiment, additional components are provided as part of receiver 100 including a second divide by N counter 128a which is also controlled by microprocessor 122 (with control shown as passing through divide by N counter 128a for purposes of simplicity). The output of second divide by N counter 128a serves as a depth locating signal, separate from the data carrier frequency. The depth locating signal is provided to driver section 140 for mixing therein with the data carrier frequency. The combined signals are then transmitted simultaneously from antenna 146. Like the data carrier frequency, the depth locating signal is transmitted at any desired frequency, selectively separate from the frequency of the data carrier frequency, and is switchable on-the-fly between any frequencies within the range of divide by N counter 128. The present example contemplates the use of two frequencies comprising a low depth frequency of 1,516 Hz and a high depth frequency of 32,766 Hz for reasons to be described below. For the moment, it is appropriate to note that this embodiment is generally advantageous with the use of the 1,516 Hz depth locating signal since the data carrier frequency may remain at a higher value. That is, the low depth frequency may be sufficiently low, in this instance, so as to adversely limit available bandwidth for purposes of data transmission. It should be appreciated that transmitter of the present invention is not limited to the exemplary embodiment described, but may be implemented in any number of alternative ways while remaining within the scope of the invention.

Having described the transmitter of the present invention, attention is now directed to additional advantages associated with the ability to transmit at two or more locating depth frequencies and, more particularly, to the advantages associated with the ability to transmit at a low depth frequency and a high depth frequency. One problem commonly encountered during drilling and locating operations relates to noise. Such noise may emanate, for example, from traffic loops and from other directional drilling and/or cable locating operations. It is therefore advantageous, in many instances, to change the locating signal to one or the other of the possible locating frequencies which is less susceptible to the particular noise that is being encountered within the drilling region. Another problem has been found to stem from the presence of metal reinforcing bar present, for example, within concrete structures or roadbeds within the drilling region. The capability to use a relatively low locating frequency is advantageous in this particular situation because induced currents in the reinforcing bar increase in proportion to the locating frequency. At the low 1,516 Hz frequency contemplated for use herein, actual testing reveals a virtual absence of interference effects even with the presence of a considerable amount of reinforcing bar.

Figure 18:
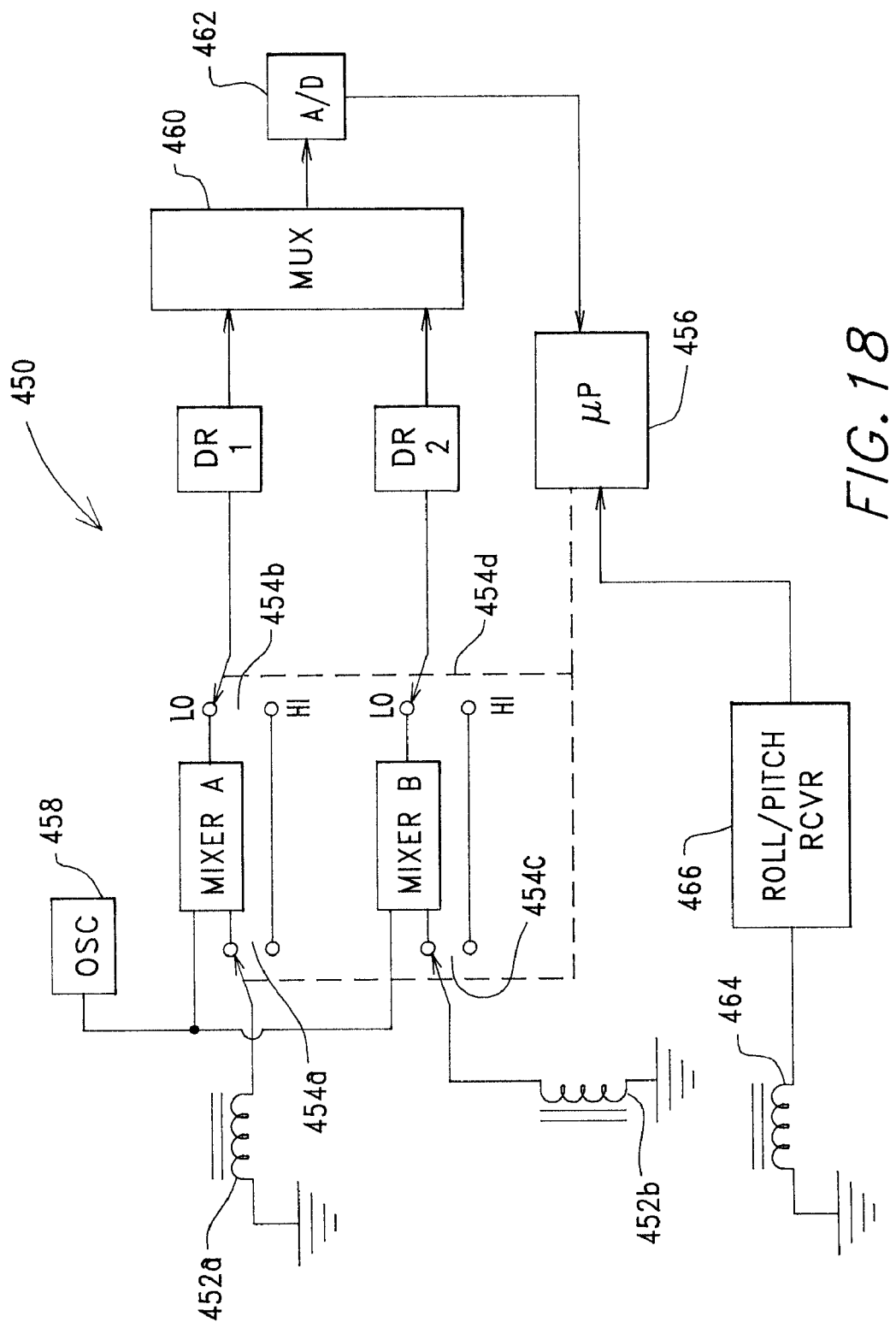
FIG. 18 is a block diagram of one configuration of a multi-frequency receiver produced in accordance with the present invention.

Turning to FIG. 18 in conjunction with FIG. 7, a highly advantageous dual frequency receiver, produced in accordance with the present invention, is generally indicated by the reference number 450. The latter includes first and second orthogonally arranged antennas indicated by the reference numbers 452a and 452b, respectively. A four pole double throw relay includes four sets of contacts indicated by the reference numbers 454a-d that are controlled by a microprocessor 456. Antenna 452a is connected to the pole of contact set 454a while antenna 452b is connected to the pole of contact set 454c. With the relay contacts closed in the upper position, as illustrated, receiver 450 is configured for reception of the low depth frequency such that the received locating signal on each of antennas 452a and 452b is coupled into mixer A and mixer B, respectively. Each mixer additionally receives a mixing frequency produced by a local oscillator 458. In the present example, the local oscillator frequency is set to 31,250 Hz. The latter mixes with the received 1,516 Hz low depth frequency to produce an output frequency of 32,766 Hz at the output of each mixer. Relay contact sets 454b and 454d direct the mixed signals to a first depth receiver DR1 and a second depth receiver DR2, respectively. The depth receivers perform appropriate signal processing such as, for example, filtering and amplification. The processed signals are then transferred to a multiplexer 460. The analog multiplexed signals originating from the first and second depth receivers are converted to digital form using an analog to digital converter 462. The digitized depth signals are then received by microprocessor 454.

At the same time, a roll/pitch antenna 464 receives the roll/pitch carrier for use by a roll/pitch receiver 466. In one embodiment, the roll/pitch carrier may remain at approximately the same frequency as the high depth frequency, 32,766 Hz, independent of the depth locating frequency. The roll/pitch receiver recovers available boring tool data including, but not limited to roll, pitch, temperature, battery status and any other suitable information transmitted for presentation to microprocessor 454. In another embodiment, the roll/pitch carrier may comprise whichever depth frequency is being transmitted. That is, the roll/pitch data is encoded upon and accompanies the depth carrier frequency. In this instance, an additional mixer is provided to heterodyne the low depth frequency up to the high depth frequency using oscillator 458 and a relay connection arrangement. This arrangement and the additional mixer have not been illustrated since it appears essentially the same as the arrangements described above associated with the high and low depth frequencies. Further details regarding these embodiments will be provided below.

Receiver 450 is configured for operation in one of two selectable modes with respect to reception of the locating signal at a selected one of two or more frequencies—a manual mode and an automatic mode. These choices are presented to the operator during power-up sequencing. In the manual mode, the operator selects the locating signal frequency from a set of available frequencies. The receiver is then forced to receive at that frequency irrespective of which frequency is in actual use. This feature is advantage, for example, where two drill rigs are operating in the same region. In the automatic mode, which is also selectable by the operator, the receiver searches for the locating frequency in use and remains at that frequency. In embodiments where the roll/pitch data is transmitted via a carrier that is separate from the depth locating signal, the receiver is responsive to periodic frequency update information that is encoded along with other data on the roll/pitch carrier, which updates may be transmitted from the boring tool, for example, in accordance with method 400 of FIG. 17. It should be noted that a single bit in the encoded data may be used as a command or code to indicate the selected depth carrier frequency where two depth frequencies are available. In this way, the receiver is able to find the locating signal by merely reading the relevant data and is dynamically responsive when the locating frequency toggles. In embodiments where the encoded frequency is encoded on the depth carrier signal to change in frequency therewith, one or more frequency updates are transmitted by the boring tool prior to switching frequencies such that the receiver is dynamically responsive to frequency toggling.

Another feature provided by receiver 450 relates to the way in which the receiver powers up. In particular, the receiver powers up at the same locating signal frequency at which it was last powered down. Such a power-up frequency feature is highly advantageous in a number of operational scenarios particularly where the frequency data is encoded on the depth locating signal. For example, if the receiver is turned off during a lunch break, drilling operations may resume without the need to verify that the receiver is on the correct locating frequency. As another example, in a situation where the operator uses the manual mode to force the receiver to receive at a particular depth carrier frequency in a region where two drill rigs are operating, it is assured that the operator will resume tracking the correct locating signal. In this regard, a receiver configured to always revert to one particular depth carrier frequency at power-up is considered as being unacceptable. The power-up frequency feature of the present invention may readily be implemented in a power up/down routine using microprocessor 454 by one having ordinary skill in the art in view of this overall disclosure. Moreover, the design of receiver 450 may be modified in any suitable manner while remaining within the scope of the present invention so long as the teachings herein are applied.

Figure 19:
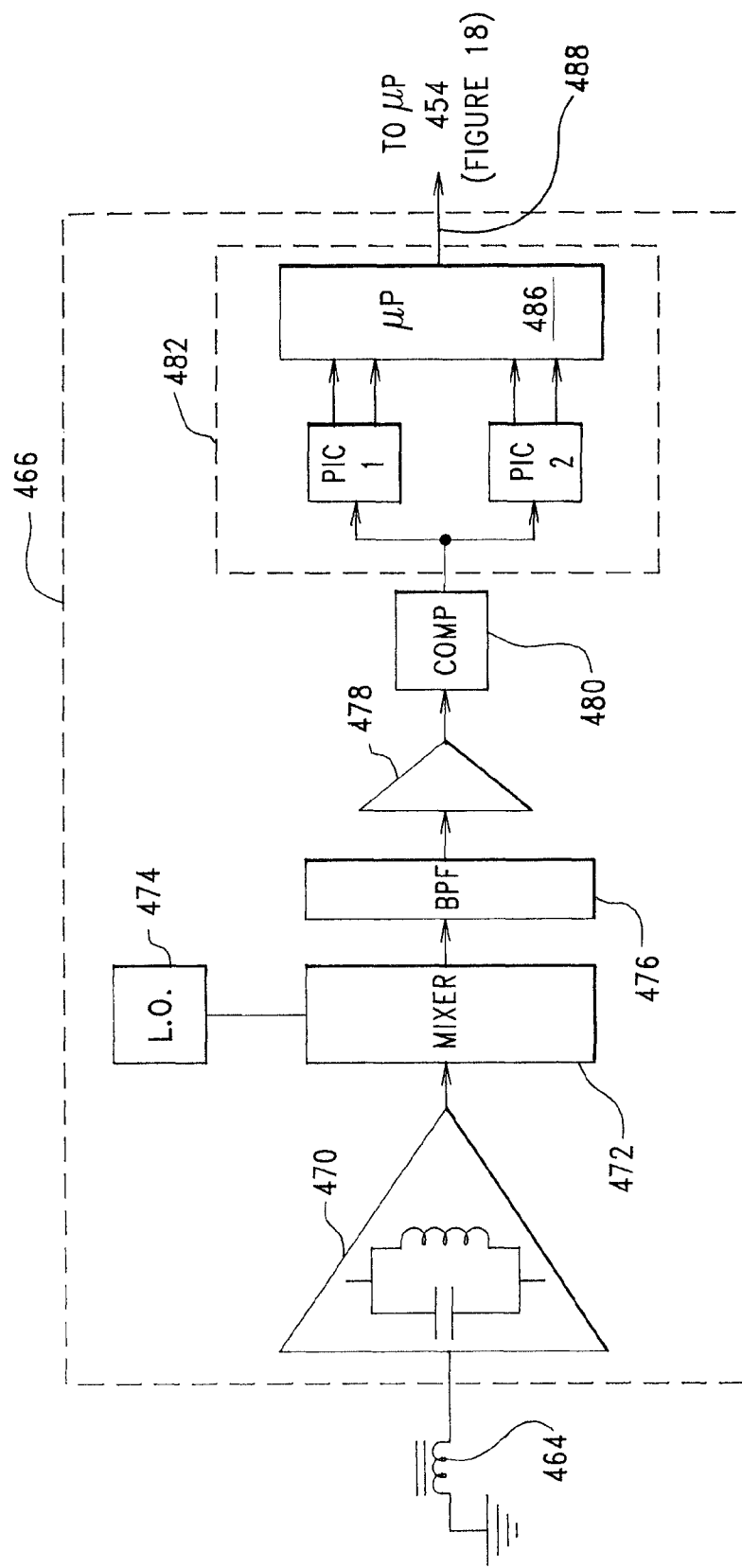
FIG. 19 is a block diagram of one possible implementation of a roll/pitch receiver forming part of the receiver of FIG. 18 shown here to illustrate details of its configuration.

Attention is now directed to FIG. 19 which illustrates roll/pitch receiver 466 of FIG. 18 in block diagram form. A tuned amplifier 470 is connected to roll/pitch antenna 464 for receiving the roll pitch carrier frequency which is essentially an analog signal or stream having encoded digital information. Again, an additional mixer and extension of the relay switching arrangement have not been illustrated since the addition of these components is within the capabilities of one having ordinary skill in the art. Tuned amplifier 470 is tuned sufficiently narrow so as to eliminate noise outside the frequency range of interest. As mentioned above, data may be encoded, for example, using tones. In one implementation, the tones may be encoded at one or more frequencies below 1 kHz. The present example contemplates the use of two different tones which are transmitted for a predetermined interval that is termed a "bit time", as will be seen.

Still referring to FIG. 19, roll pitch receiver 466 includes a mixer 472 and a local oscillator 474. The latter may be replaced, if so desired, by a tuning arrangement (not shown) including an oscillator and a divide by N counter reflecting the configuration previously described with regard to receiver 100 of FIG. 7 in implementations which utilize two or more roll/pitch carrier frequencies. In such implementations, the tuning arrangement as well as tuned amplifier 470 may be under microprocessor control. Local oscillator 474 operates at a frequency which is selected so as to mix the data tones down to a base band frequency range to recover the tones at their original frequencies. A band pass filter 476 strips away extraneous noise. The tones are then amplified using an amplifier 478. In accordance with the present invention, a comparator 480 converts the analog tone data into binary digital data by comparing the incoming information to a switching threshold. Thereafter, the binary tone data is received by a highly advantageous tone detection arrangement 482 which is indicated within a dashed line. Tone detection arrangement 482 itself includes first and second microcontrollers selected, for example, from the PIC series of microcontrollers that are available from Microchip and which are indicated as PIC1 and PIC2. These microcontrollers utilize a RISC (Reduced Instruction Set Architecture). In essence, a bare minimum set of instructions is provided. These microcontrollers, in turn, interface with a supplemental microprocessor 486. The latter outputs data to main microprocessor 454 on a line 488, shown in FIG. 18. Specific details regarding the operation of tone detection arrangement 482 will be provided immediately hereinafter.

Each microcontroller (PICs 1 and 2) is configured for detecting a single, "target" tone. Thus, two microcontrollers are provided in the present example. The incoming data is sampled at a predetermined rate based on the target tone. The amplitude, F, of a particular frequency may be represented using an in-phase component, I, and a quadrature component, Q where:

$$|F|=\sqrt{I^2+Q^2} \qquad (51)$$

Where F represents the magnitude of a time dependent function. It is noted that phase information may be obtained based on the ratio of I over Q. Components I and Q may be represented by the integrals:

$$I=\int F(t)\cos(\omega t)dt, \text{ and} \qquad (52)$$

$$Q=\int F(t)\cos(\omega t)dt. \qquad (53)$$

A match filter configuration is used in a highly advantageous manner for evaluating I and Q. Specifically, the foregoing integrals are approximated by evaluation at every 90° interval equating to four samples per cycle of the "target" tone. In other words, a sample is taken every ¼ cycle. A plurality of samples is taken over a sampling period, which is based, for example, on the anticipated time duration of the target tone. It will be appreciated that a match filter essentially determines the coefficient or amplitude of a particular frequency of interest consistent with an abbreviated form of Fourier transform. The values of the sine and cosine functions at 90° intervals are given by Table 1.

TABLE 1

Cosine and Sine Function Values per 90° Intervals

| Function | 0° | 90° | 180° | 270° |
|---|---|---|---|---|
| cos ωt | 1 | 0 | −1 | 0 |
| sin ωt | 0 | 1 | 0 | −1 |

Based on the foregoing, the approximation ignores F(t) cos ωt at ωt=90° and 270°, since cos ωt=0. Further, the approximation ignores F(t) sin ωt at ωt=0° and 180°, since sin ωt=0. The value of I is therefore contributed to at ωt=0° and 180° while the value of Q is contributed to at ωt=90° and 270°. In this regard, it is important to understand that comparator 480 converts the incoming data to binary form based on a single threshold. The value of the data, F(t) at any one point in time is, therefore, a binary zero (0) or a binary one (1). Accordingly, the determined value of the approximation is either a 0 or 1, based on the incoming data, which is multiplied by a 1 or −1, based on the corresponding value of cos ωt or sin ωt. Table 2 illustrates the output value for each of I and Q based on the various input parameters. An "X" in the I and Q columns denotes an ignored value. That is, there is no need to determine a value for that particular combination of input parameters for the indicated I or Q value since either cos ωt or sin ωt controls by being equal to zero. For descriptive purposes, the I approximation may be considered as being evaluated at odd numbered sample intervals while the Q approximation may be considered as being evaluated at even numbered sample intervals.

TABLE 2

Match Filter Definition

| ωt | cos ωt | sin ωt | Input Data | I | Q |
|---|---|---|---|---|---|
| 0° | 1 | 0 | 0 | 0 | X |
| 90° | 0 | 1 | 0 | X | 0 |
| 180° | −1 | 0 | 0 | 0 | X |
| 270° | 0 | −1 | 0 | X | 0 |
| 0° | 1 | 0 | 1 | 1 | X |
| 90° | 0 | 1 | 1 | X | 1 |
| 180° | −1 | 0 | 1 | −1 | X |
| 270° | 0 | −1 | 1 | X | −1 |

It should be appreciated that the match filter of the present invention effectively serves to eliminate the need for multiplication, rather the inclusion of a minus sign is simply required at the appropriate times seen in Table 2. Moreover, a number of complex mathematical operations are eliminated, at least including the need to actually evaluate the sine and cosine functions. Still further advantages will be described below.

Figure 20:
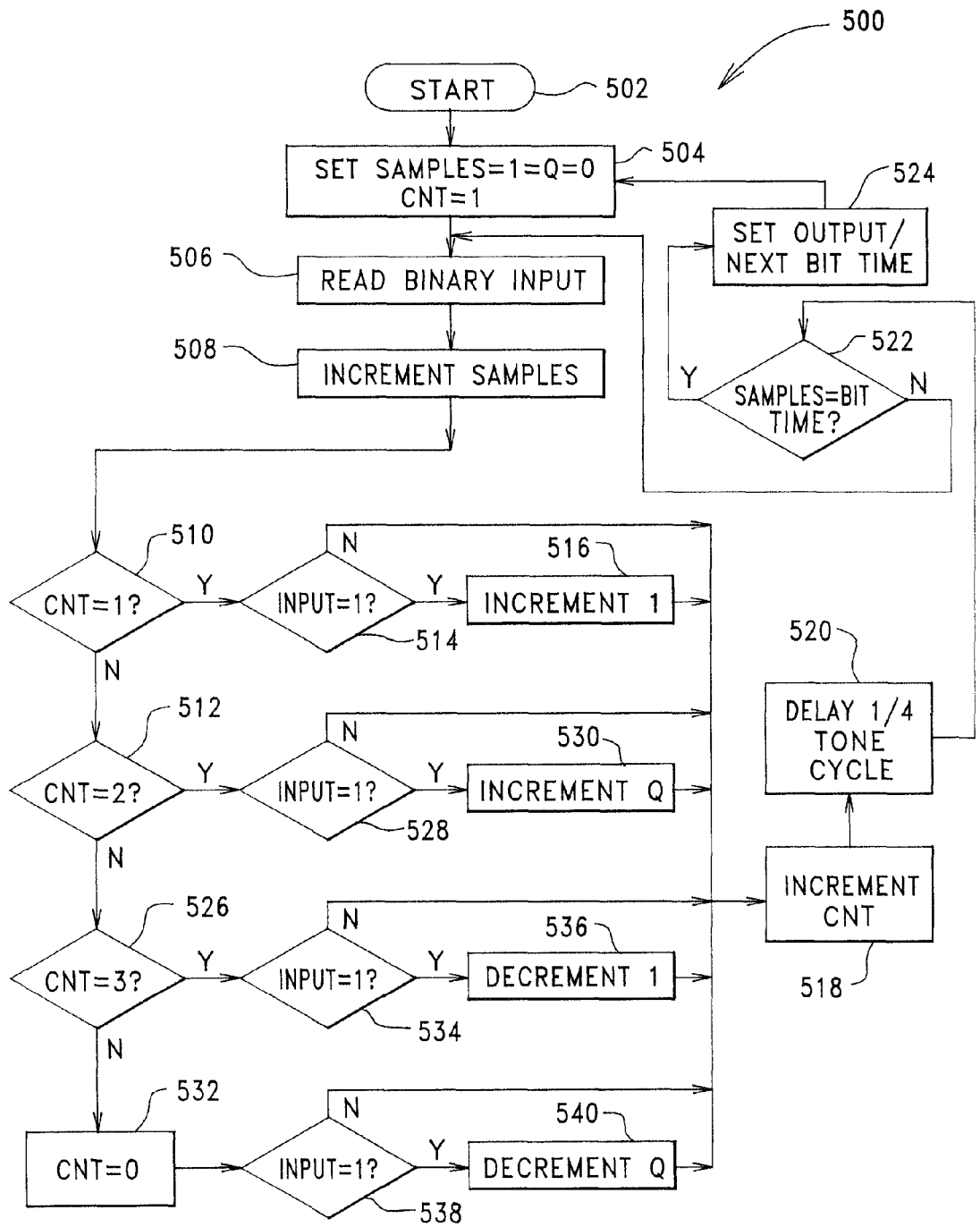
FIG. 20 is a flow diagram illustrating one implementation of a digital match filter in accordance with the present invention for use in tone detection used in the roll/pitch receiver of FIG. 19.

Turning now to FIG. 20, having described the approximation used in the match filter of the present invention, specific details with regard to its implementation in the PIC microcontrollers will now be described with reference to a match filter method that is generally indicated by the reference number 500. It is noted that each of the values of I and Q is stored in a respective accumulator or memory location (not shown). Method 500 begins with a start step 502 and proceeds to step 504 in which a number of values denoted as "Samples", I and Q are set to 0. CNT is set to 1. Samples represents a running total of the number of samples taken by the filter while CNT is a counter value. Step 506 then reads the binary data input value. Step 508 then increments Samples. Thereafter, step 510 tests the value of CNT, if it is not equal to 1, step 512 is next performed, as will be described. If, on the other hand, CNT is equal to 1, step 514 is performed. This latter step tests the binary data input value. If the input is 1, step 516 is performed which increments I by one unit. If the input value is 0, step 516 is not performed. Following either case, step 518 increments the value of CNT by 1. In the present example, CNT now is equal to 2.

Following Step 518, step 520 introduces a ¼ cycle delay which coincides with ¼ of the cycle time of the target tone being detected by this particular filter. The filter is therefore advantageously adaptable to the detection of any target tone through the simple expedient of adjusting the delay introduced by step 520. In step 522, the value of Samples is compared to the bit time. In other words, some predetermined number of samples are taken over successive bit times. If Samples is equal to the bit time, step 524 causes the filter to provide an approximate output magnitude, as will be further described. Execution then moves back to step 504, to set up for monitoring over the next bit time. If Samples is less than the bit time, execution moves from step 522 directly back to step 506.

Returning to the discussion of step 512, with CNT=2 on the second loop through process 500, step 510 passes execution to step 512. The latter compares CNT to the value 2. If the value of CNT is not equal to 2, step 526 is performed, as will be described. If the value of CNT is equal to 2, step 528 is performed to test the binary data input value. If the input is 1, step 530 is performed which increments Q by one unit. If the input binary value is 0, step 530 is not performed. In any case, step 518 then increments the value of CNT by 1. In the present example, CNT now is equal to 3. Execution continues with steps 520 and 522 returning to either step 504 or 506 dependent upon the outcome of step 522. In the present example, it is assumed that Samples is less than the bit time such that processing returns to step 506.

On the third loop through process 500 with CNT=3, step 506 reads the binary value anew and step 508 increments Samples. Step 510 passes operation to step 512 which, in turn, passes operation to step 526. If the value of CNT is not equal to 3, step 532 is performed, as will be described. If the value of CNT is equal to 3, step 534 is performed to test the binary data input value. If the input is 1, step 536 is performed which decrements I by one unit. If the input binary value is 0, step 530 is not performed. Thereafter, step 518 then increments the value of CNT by 1. In the present example, CNT now is equal to 4. Execution continues with steps 520 and 522 returning to either step 504 or 506 dependent upon the outcome of step 522. In the present example, it is assumed that Samples remains less than the bit time such that processing returns to step 506.

On the fourth loop through process 500 with CNT=4, step 506 once again reads the binary data value and step 508 increments Samples. Step 510 passes operation to step 512 which, in turn, passes operation to step 526 and then to step 532. The latter resets CNT to 0. Step 538 then tests the binary data input value. If the input is 1, step 536 is performed which decrements Q by one unit. If the input binary value is 0, step 530 is not performed. Thereafter, step 518 then increments the value of CNT by 1 such that CNT=1. Execution continues with steps 520 and 522 returning to either step 504 or 506 dependent upon the outcome of step 522. The process will repeat beginning with step 504, once Sample is equal to the bit time at step 522.

It should be appreciated that step 524 is performed at the conclusion of each sampling duration which is generally set to one bit time. Accordingly, an accumulated value is associated with each of I and Q, as determined over the number of samples associated with each bit time. Method 500 is highly advantageous in that only simple arithmetic operations are needed. That is, increment by one unit and decrement by one unit. Alternatively, the accumulator value is simply maintained. The magnitude of the target tone may be determined in a number of different ways such as, for example, using equation 51 with the established values of I and Q. In this regard, however, it should be appreciated that equation 51 requires the use of several relatively complex mathematical operations including squaring and square root. As will be seen, the present invention provides a highly advantageous magnitude estimation method which does not rely on such complex mathematical functions while maintaining sufficient accuracy, as will be described immediately hereinafter. It should be appreciated that the roll/pitch receiver may be implemented in an unlimited number of ways while remaining within the scope of the present invention. For example, the use of PIC microcontrollers is not required by implementing the receiver of the present invention with a single microprocessor. Moreover, it is considered that the steps which make up method 500 may be modified or practiced in many other different, but suitable orders while remaining with the scope of the present invention.

Figure 21:
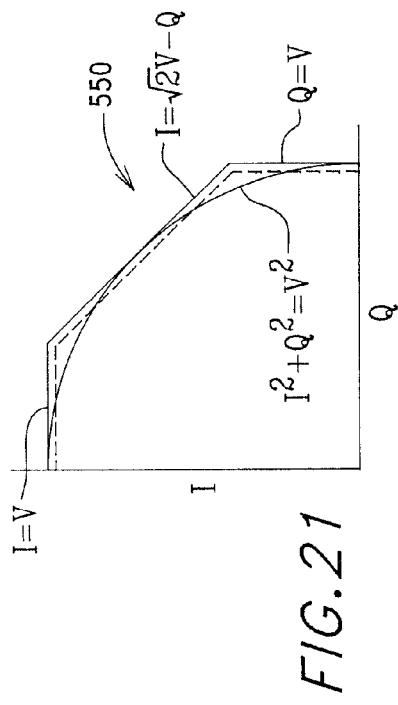
FIG. 21 is a diagrammatic plot showing in-phase and quadrature components used in determining the approximate magnitude of a tone implemented as used in the roll/pitch receiver of FIG. 19.

Attention is now directed to FIG. 21 which illustrates a Q-I coordinate axis generally illustrated by the reference number 550. The equation $I^2+Q^2=V^2$ is plotted on the coordinate axis wherein V represents a scaling constant. The semi-circular plot corresponding to this equation represents the locus of points for the exact value of the magnitude of the determined tone, in accordance with equation 51. The magnitude is determined by the present invention using a three line approximation. The three lines used in the magnitude estimation are I=V, I=Q and I=$\sqrt{2}$V−Q. As shown in the figure, each line forms a segment that is tangent to $I^2+Q^2=V^2$ for use in the approximation. While this approximation, in and by itself, provides acceptable accuracy, it has been found that accuracy is still further enhanced by using the lines:

$$I = KV, \quad (54)$$

$$Q = KV, \text{ and} \quad (55)$$

$$I = \left[\sqrt{2} - \frac{1-K}{\sqrt{2}}\right]V - Q \quad (56)$$

where K is a constant. One useful value for K has been found to be 0.974. Using this value, FIG. 21 shows dashed lines representing these line segments. Each is shifted just slightly toward the origin so as to overlay and intersect the $I^2+Q^2=V^2$ circle. Using the approximation with this accuracy enhancement and K=0.974, an error of no more than 6% is achieved. The specific manner in which this curve fit is used by set output step 524 of FIG. 20 using each PIC microcontroller will be described immediately below.

Referring to FIGS. 20 and 21, it should be appreciated that V may be considered to represent a threshold at or above which a tone is present. Accordingly, the three segment curve fit is performed by testing the inequality I≧V. If satisfied, step 524 indicates the presence of the target tone. Otherwise, the inequality Q≧V is tested. If this latter inequality is satisfied, step 524 indicates the presence of the target tone. In the event that neither of the first two inequalities is satisfied, the inequality I+Q≧$\sqrt{2}$V is tested. If satisfied, step 524 indicates the presence of the tone. In the event that none of the inequalities is satisfied, the tone is indicated as being absent. Of course, these curve fit inequalities are readily adapted to accommodate enhanced accuracy in view of equations 54-56 by replacing the equals sign with a greater than or equal to sign. The use of two or more tones will be considered immediately hereinafter.

Referring to FIGS. 19-21, where two or more tones may be present, it is advantageous to provide discrimination therebetween. In this case, it may be preferable to normalize the accumulated values of I and Q against the total number of samples taken in a bit time since bit times for different tones may include different numbers of samples. FIG. 19 illustrates that each PIC microcontroller provides its tone indication output to microprocessor 486 via two data lines. Accordingly, the absence of a tone may be indicated as 0,0 on these lines. The three remaining signaling combinations (0,1; 1,0 and 1,1) represent increasing relative magnitude of the tone. These three relative magnitudes correspond to three different values of V, as used in the inequalities of the curve fit approximation. That is, the curve fit is repeated using a set of magnitude thresholds: $V_1$, $V_2$ and $V_3$ where $V_1<V_2<V_3$. It should be appreciated that any number of thresholds may be used dependant on a particular implementation. In instances where two or more tones are indicated as having the same magnitude, a priority mechanism may be invoked whereby the tone which occurs most often out of the tones which make up the tie is indicated as being present. In an actual implementation, having I and Q normalized to the range 0-1, the values 0.50, 0.56 and 0.62 were used for $V_1$, $V_2$ and $V_3$, respectively.

Turning to FIGS. 19 and 20, it is important to understand that method 500 represents the implementation of a single match filter. As will be seen, each of the PIC controllers in FIG. 19 executes a plurality of individual ones of these highly advantageous digital match filters simultaneously.

Figure 22:
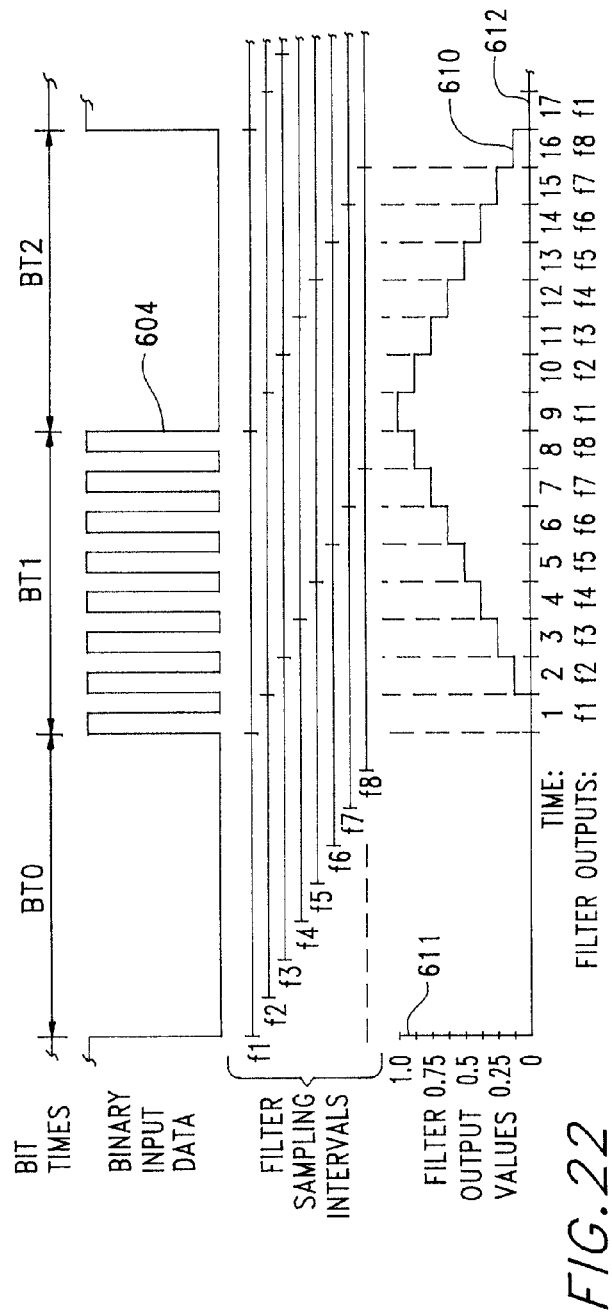
FIG. 22 is a diagrammatic plot illustrating the operation of a plurality of digital match filters operating in staggered time relation with respect to one another for use in tone detection in accordance with the present invention.

Referring to FIG. 22, the simultaneous operation of a plurality of digital match filters within one of the PIC controllers of FIG. 19 is diagrammatically illustrated. Operation is shown over a time period comprising three bit times which are individually indicated as BT0, BT1 and BT2. An input data plot illustrates the incoming binary data as received by the PIC controller. A tone 604 is present within the binary data throughout BT1. The frequency of the tone has not been shown to scale for illustrative purposes. It should be remembered that each filter operates for the duration of one bit time at the conclusion of which step 524 provides an output for that filter. The filter, thereafter, immediately begins sampling over the next bit time. Moreover, no synchronization is required between the start times of the various filters and the actual bit times seen in the incoming data. Such a synchronized relationship has been illustrated here only for purposes of simplifying the present description in order to aid the reader's understanding.

Still referring to FIG. 22, filter sampling times are illustrated for each of eight individual filters implemented within the PIC microcontroller. Individual ones of the filters are indicated as f1-f8. While eight filters are illustrated in the present example, it should be appreciated that the total number of filters implemented within any one microcontroller is dependent upon the processing capabilities of the particular microcontroller in use. As the number of implemented filters is increased, accuracy in the detection of tone edges is improved correspondingly. Filters f1-f8 are initialized at staggered time increments corresponding to ⅛ of a bit time, beginning with initialization of f1 at the beginning of BT0. Therefore, f1 provides an output for a duration of ⅛ of a bit time immediately following BT0. This output is illustrated in a filter output plot indicated by the reference number 610. The filter output plot is normalized for purposes of clarity shown from 0 to 1 along a vertical axis 611. A time line 612 immediately below the filter output plot labels ⅛ bit time increments 1-17 for descriptive purposes. Further, below that, the filter providing the indicated output for that increment is denoted. It can be seen that the output of f1 corresponding to BT0 is zero during time increment 0, since f1 saw none of tone 600.

Filter f2 starts ⅛ of a bit time following the start of filter f1 and completes sampling for one bit time with the conclusion of time increment 1. Thus, filter f2 samples during ⅛ of the total duration (one bit time) of tone 604. The corresponding output of filter f2 is ⅛ (0.125) during time increment 2. Each successive filter samples over an additional ⅛ of the duration of tone 604. For this reason, the filter output plot steps incrementally up by ⅛ with the output of each successive filter. For example, filter f7 outputs ⅝ (0.75) during time increment 7 while filter f8 outputs ⅞ (0.875) during time increment 8.

With continuing reference to FIG. 22, each filter restarts immediately upon completing sampling for a duration corresponding to one bit time, even as its output is being determined and provided. Thus, filter f1 restarts at the beginning of time increment 1 and concludes sampling for the duration of one bit time with the conclusion of time increment 8. The output during time increment 9 is then responsive to the value determined using filter f1 sampling over BT1. Therefore, the output value seen in output waveform plot 610 is 1.0 during time increment 9.

At time increment 9, filter f1 restarts for a second time, providing an output during time increment 17. Since the f1 filter samples over BT2, during which no tone is present in the input binary data, the output during time increment 17 is zero.

The filtering process continues with each of filters f2-f8 restarting with successive ⅛ bit time increments. In this instance, however, each successive starting filter sees ⅛ less of tone 604. For example, the output corresponding to the restart of filter f2 is present during time increment 10 and has a value of ⅞ (0.875). The outputs corresponding to the restart of filters f3-f8 are present during time increments 11-16, respectively, having values decreasing by ⅛ with each successive filter output. Thus, filter output plot 610 has stepped up in value from 0.0 up to 1.0 and then stepped down in value back to 0.0. If tone 604 is present during alternating ones of the bit times (partially shown), filter output plot 610 approximates a triangular waveform. The filters operate continuously in a staggered time relation to one another. It should be appreciated that the filter output plot crosses the value 0.5 at time increments 5 and 13, corresponding to one bit time. If the value of V, as described above, is set to a threshold of 0.5 the combined outputs of the filters will indicate the presence of tone 604 with as significant degree of accuracy, delayed by one-half of one bit time. The effect of using increasing numbers of filters resides in a smoother appearing triangular waveform (not shown). For example, if 16 filters are used, the vertical steps in the filter output plot are 1/16, as opposed to ⅛, while the time increments shown in time line 612 are reduced in duration by one-half.

Having described the highly advantageous roll/pitch receiver and digital match filter of the present invention, it is appropriate to draw a comparison with the prior art. The approach taken in the prior art has generally been digitization of incoming data using an analog to digital converter such that the digitized data represents a plurality of discrete magnitude values responsive to the incoming data. The data is typically processed using a digital signal processor invoking rather intensive and complex computations such as, for example, Fast Fourier Transform. The present invention, in contrast, provides a far less computationally complex approach which yet remains highly effective. In this regard, it is important to understand that the digital match filter and tone detection arrangement of the present invention enjoy wide application and are in no way limited to use in drilling systems.

In that skin depth compensation arrangements, multi-frequency transmitters, multi-frequency receivers and associated methods disclosed herein may be provided in a variety of different configurations and modified in an unlimited number of different ways, it should be understood that the present invention may be embodied in many other specific forms without departing from the spirit of scope of the invention. Therefore, the present examples and methods are to be considered as illustrative and not restrictive, and the invention is not to be limited to the details given herein, but may be modified within the scope of the appended claims.

What is claimed is:

1. In a system in which a transmitter is moved through the ground in a region, said system including a locating arrangement for tracking the position of and/or guiding the transmitter as the transmitter moves through the ground, said locating arrangement comprising:
   a configuration, forming part of said transmitter, for transmitting a locating signal at a current one of at least two locating frequencies and for transmitting a frequency designation identifying one of said frequencies of the locating signal; and
   a locator which receives the frequency designation and the locating signal for use in tracking the transmitter and including a frequency tracking arrangement for switching the locator between different ones of the locating frequencies, as the current locating frequency, based on said frequency designation.

2. The locating arrangement of claim 1 wherein said locator is configured for automatically switching between said frequencies based on said frequency designation.

* * * * *